(12) United States Patent
Hayakawa et al.

(10) Patent No.: US 6,573,855 B1
(45) Date of Patent: Jun. 3, 2003

(54) THREE-DIMENSIONAL QUESTING METHOD, THREE-DIMENSIONAL VOXEL DATA DISPLAYING METHOD, AND DEVICE THEREFOR

(75) Inventors: Hideki Hayakawa, Osaka (JP); Akira Kawanaka, Tokyo (JP); Yasuhiro Takesue, Tokyo (JP)

(73) Assignee: Osaka Gas Co., Ltd. (JP)

( * ) Notice: Subject to any disclaimer, the term of this patent is extended or adjusted under 35 U.S.C. 154(b) by 0 days.

(21) Appl. No.: 09/763,939

(22) PCT Filed: Aug. 27, 1999

(86) PCT No.: PCT/JP99/04670
§ 371 (c)(1),
(2), (4) Date: May 31, 2001

(87) PCT Pub. No.: WO00/13037
PCT Pub. Date: Mar. 9, 2000

(30) Foreign Application Priority Data

Aug. 31, 1998 (JP) .............................................. 10-245345
Nov. 24, 1998 (JP) .............................................. 10-332459
Nov. 25, 1998 (JP) .............................................. 10-333596

(51) Int. Cl.[7] ......................... G01S 13/88; G01S 15/88; G01V 1/00; G01V 3/12
(52) U.S. Cl. ......................... 342/22; 342/176; 342/180; 342/195; 702/14; 702/16; 367/14; 367/68; 367/72; 367/87
(58) Field of Search ............................ 342/22, 25, 26, 342/175–186, 190–197, 27, 28; 367/14, 15, 25, 36, 37, 38, 68–73, 87, 88; 600/443; 702/18, 2–17

(56) References Cited

U.S. PATENT DOCUMENTS 5,671,136 A * 9/1997 Willhoit, Jr. .................. 702/18
5,673,697 A * 10/1997 Bryan et al. ................. 600/443
6,177,903 B1 * 1/2001 Fullerton et al. ............. 342/28
6,218,979 B1 * 4/2001 Barnes et al. ................ 342/28

FOREIGN PATENT DOCUMENTS

| JP | 854476 | 2/1996 |
| JP | 854477 | 2/1996 |
| JP | 8299341 | 11/1996 |
| JP | 9281229 | 10/1997 |
| JP | 1039041 | 2/1998 |
| JP | 116879 | 1/1999 |
| JP | 11271440 | 10/1999 |

\* cited by examiner

Primary Examiner—Bernarr E. Gregory
(74) Attorney, Agent, or Firm—Webb Ziesenhiem Logsdon Orkin & Hanson, P.C.

(57) ABSTRACT

In a three-dimensional exploring method for finding location of a buried object by transmitting a wave signal (4) by means of e.g. an electromagnetic wave into the ground (1) and receiving the signal reflected from the object (2) in the course of movement over the ground surface and generating three-dimensional voxel data in the form of coordinates (x, y, t) consisting of a position (x, y) and a reflection time (t) based on intensity of the reflected signal, the method effects an object voxel selecting step of selecting one or more object voxels in accordance with a manual input operation; a binarizing step of extracting a candidate voxel group consisting of a plurality of voxels interconnected with each other and having amplitude values of positive or negative polarity and having magnitudes greater than a predetermined threshold; and a connecting/composing step of extracting, from the candidate voxel group extracted by the binarizing step, a connection-candidate voxel group to be connected to the object voxels selected by the object voxel selecting step and connecting said connection-candidate voxel group with said object voxels thereby to compose an object voxel group, whereby the location of the buried object (2) is detected at high S/N ratio. Further, when three-dimensional voxel data contains.a voxel deficient in data, the method effects, on said deficient voxel, a one-dimensional linear interpolation step of effecting a one-dimensional linear interpolation in a predetermined direction in an x-y plane including said deficient voxel, so that the deficient voxel can be interpolated easily.

17 Claims, 27 Drawing Sheets

Fig.2
(A)
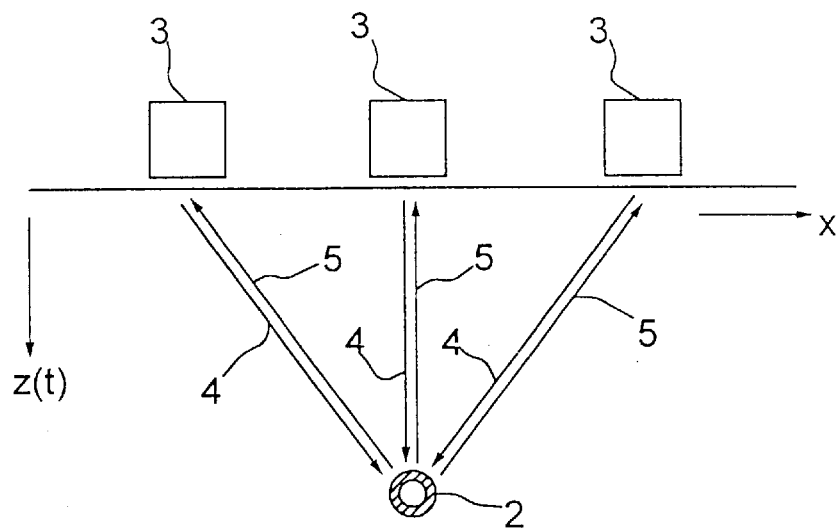
(B)
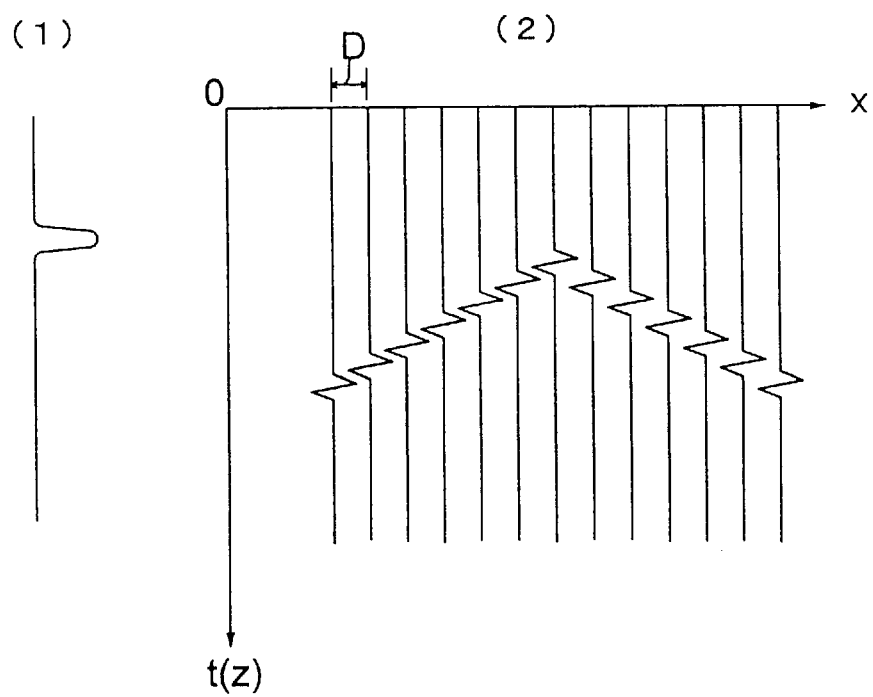

Fig.6
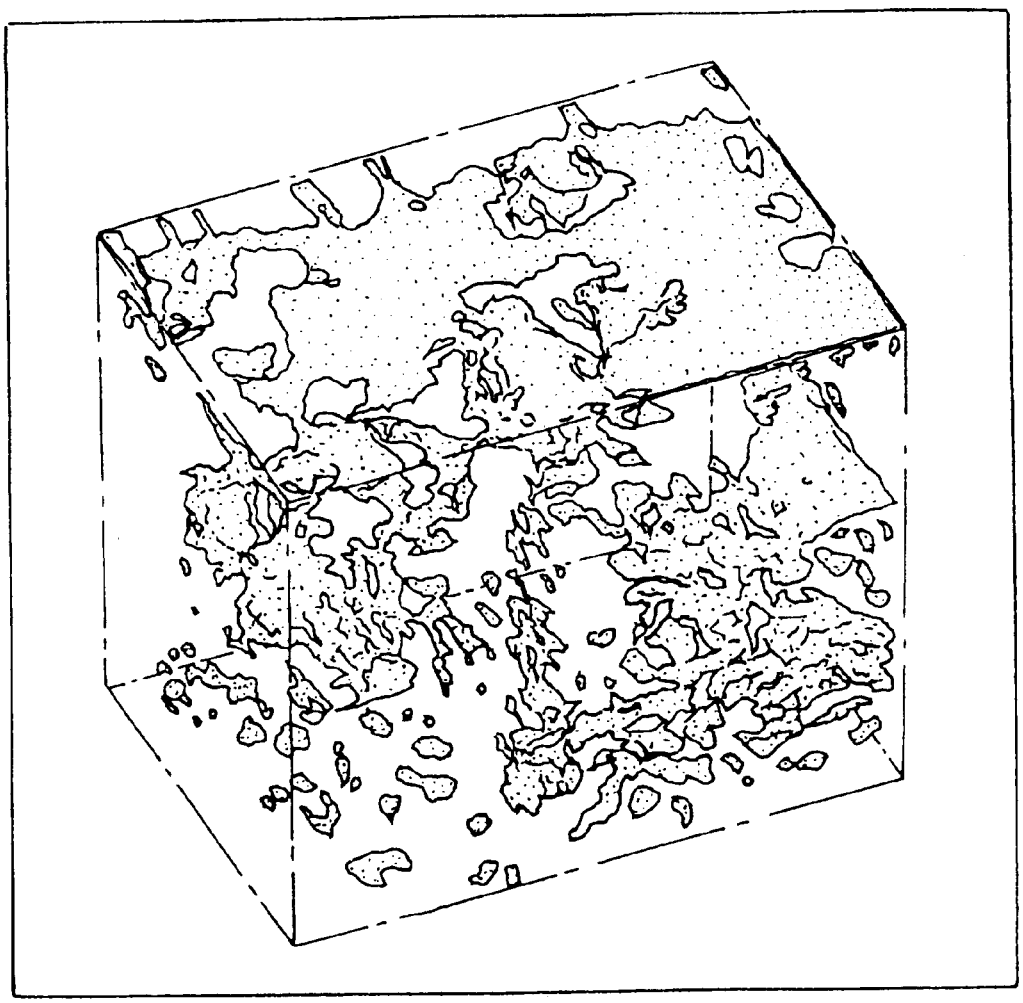
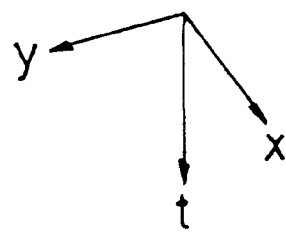

(A)

(B)

Fig.8
(A) 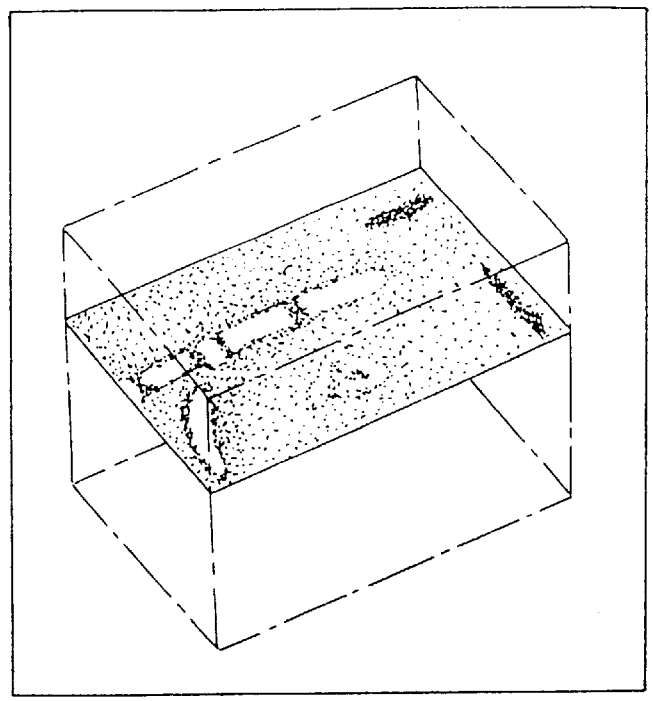
(B) 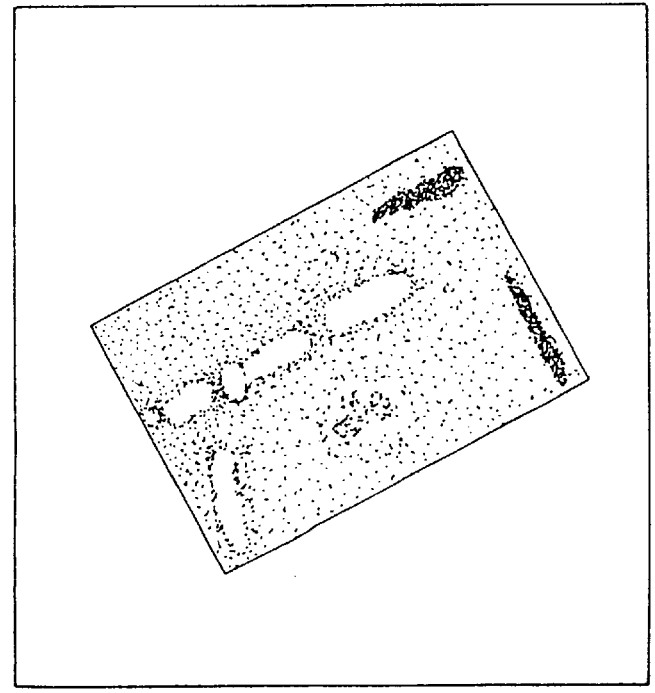

Fig.9

| 1 | CALC1 | Delete1 |
| MAX1 208 | MIN1 165 | |
| X1: 24 | Y1: 47 | T1: 5 |

| 2 | CALC2 | Delete2 |
| MAX2 70 | MIN2 100 | |
| X2: 17 | Y2: 69 | T2: 40 |

| 3 | CALC3 | Delete3 |
| MAX3 235 | MIN3 170 | |
| X3: 56 | Y3: 8 | T3: 7 |

| 4 | CALC4 | Delete4 |
| MAX4 255 | MIN4 170 | |
| X4: 57 | Y4: 29 | T4: 11 |

| 5 | CALC5 | Delete5 |
| MAX5 208 | MIN5 160 | |
| X5: 38 | Y5: 78 | T5: 12 |

| 6 | CALC6 | Delete6 |
| MAX6 18 | MIN6 90 | |
| X6: 9 | Y6: 93 | T6: 32 |

| 7 | CALC7 | Delete7 |
| MAX7 55 | MIN7 105 | |
| X7: 23 | Y7: 12 | T7: 29 |

| 8 | CALC8 | Delete8 |
| MAX8 22 | MIN8 105 | |
| X8: 40 | Y8: 23 | T8: 29 |

| 9 | CALC9 | Delete9 |
| MAX9 52 | MIN9 100 | |
| X9: 40 | Y9: 64 | T9: 30 |

| 10 | CALC10 | Delete10 |
| MAX10 40 | MIN10 90 | |
| X10: 57 | Y10: 92 | T10: 32 |

Fig. 10
(A)
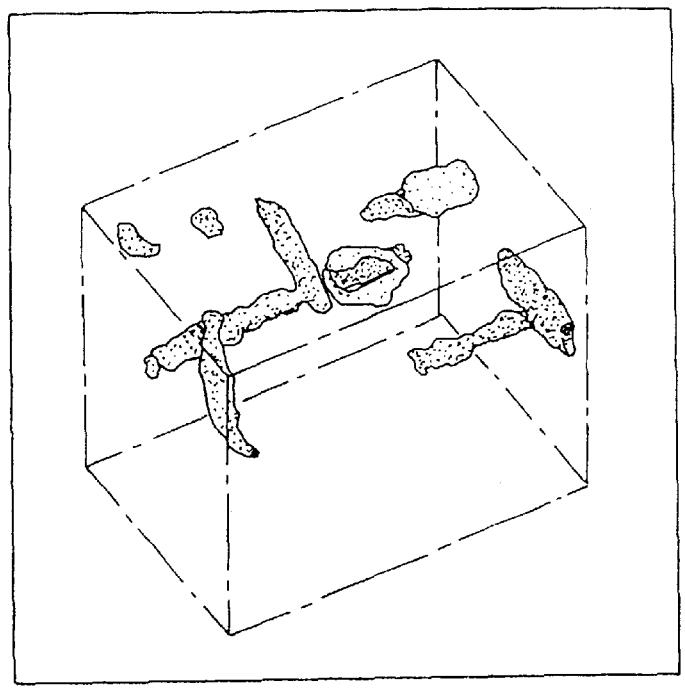
(B)
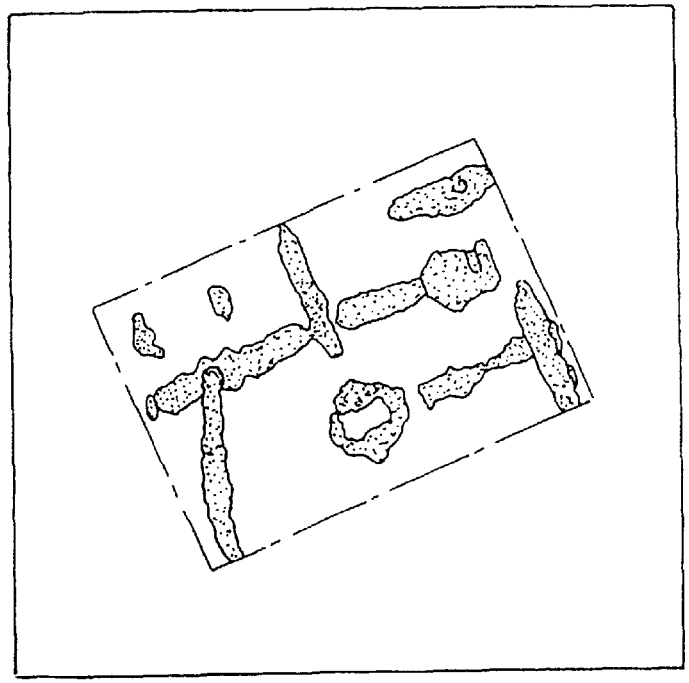

Fig. 11
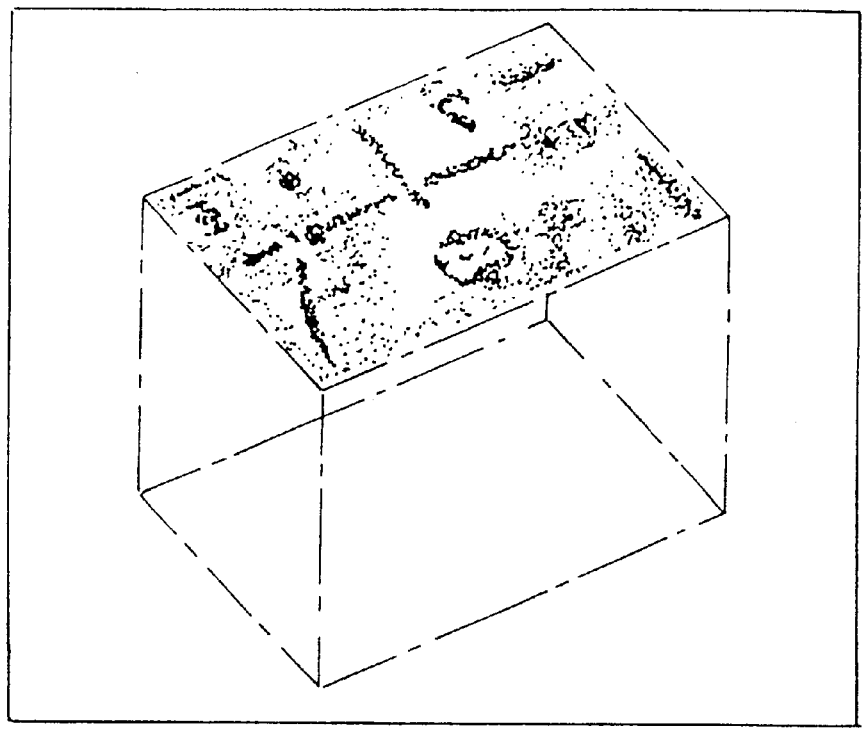
(A)
(B)

THREE-DIMENSIONAL QUESTING METHOD, THREE-DIMENSIONAL VOXEL DATA DISPLAYING METHOD, AND DEVICE THEREFOR

TECHNICAL FIELD

The present invention relates to a method and an apparatus for three-dimensional exploration wherein location of an object present within a medium is found by transmitting wave signals by means of an electromagnetic wave or sonic wave into the medium in the course of movement over the surface of the medium and receiving the signals reflected from the object within the medium and processing the received reflected-signals. The invention relates also to a method and an apparatus for displaying three-dimensional voxel data generated in the form of coordinates (x, y, t) consisting of a position (x, y) on the surface of the medium and a reflection time (t) based on a reflected signal intensity of a wave signal transmitted from the surface of medium into this medium.

BACKGROUND ART

For the three-dimensional exploration as noted above, a three-dimensional exploratory apparatus is employed for exploring an object or a hollow space buried or present underground.

A typical conventional art is known from a paper entitled: "Underground Buried Object Exploring Radar System (Part 3); Three-Dimensional Exploration Image Processing" (National Convention of The Institute of Electrical Engineers of Japan, 63$^{rd}$ year of Showa, p 1372).

According to this art (first prior art), measured section information obtained by a plurality of cycles of scanning operations is used. If an image of the buried unidentified object is obtained at identical positions in all of the plurality of section images, then the buried object is judged as a pipe. Whereas, if the image of the buried object is obtained at identical positions in fewer than all of the section images, the buried object is then judged as a block object. By determining the connectivity/non-connectivity between the images present in different sections, the three-dimensional structure is obtained.

In the above, only one kind of threshold value is employed in a binary encoding scheme based on which the presence/absence of the object is to be judged.

With the above-described prior art, the symbolic representations of the respective sections (e.g. binary symbol representation representing presence/absence of the object according to the reflected signal intensity) are connected three-dimensionally. Hence, the setting of the threshold value employed for the symbolizing scheme significantly influences the determination of the unidentified object either as a pipe or as a block object. Especially, in the case of underground exploration, the S/N ratio is low and the intensity of the reflected signal from the object can vary significantly with change of the exploring position. Therefore, in binarizing the reflected signal according to its intensity, if the threshold value is significantly lowered to enable detection of the pipe, this will lead to occurrence of a large amount of noise region of e.g. unwanted reflected signals. This is because the information about the neighboring sections is not utilized at all for the binarizing process.

Moreover, this prior art requires that the buried pipe be oriented in a direction perpendicular to the scanning direction of the apparatus. Therefore, although the symbolizing method as above may be useful on such prerequisite, the reliability of exploration is reduced when the buried pipe is not oriented in the direction perpendicular to the scanning direction.

Also, with the three-dimensional exploratory apparatus, the electromagnetic wave is transmitted into the ground at a position (x, y) on the ground surface and the signal reflected from the buried object is received, in the course of which the reflected signal intensity (s) is determined at every reflected time (t) of a predetermined interval. Therefore, if positions (x, y) on the ground surface of the three-dimensional exploratory apparatus are taken in the form of a grating pattern of a predetermined spacing, it is possible to obtain complete three-dimensional voxel data s (x, y, t) having data values (reflected signal intensities (s)) at all of its voxels. However, when the three-dimensional exploratory apparatus is scanned on the ground surface, depending on the actual surface condition of the exploration site such as the ground surface being a road surface, it is not always possible to effect this scanning operation exactly in the form of grating pattern, due to safety and/or time restriction. Then, while the data measurement can be done densely in the direction of the reflection time (t), both voxels having data values and voxels not having any data values coexist in the x-y plane. Here, for such three-dimensional voxel data, a voxel having a data value is defined as a source voxel and a voxel not having any data value is defined as a deficient voxel.

Conventionally, as a method of interpolating such a deficient voxel in such three-dimensional voxel data which are irregularly present in the x-y plane, it is well-known, as a second prior art, to effect weighting of the interpolation according to its distance from a source voxel. According to this prior art, when the distance between a deficient voxel and a source voxel (voxel value (s)) is D, the interpolation for this deficient voxel is done with a value (s') obtained by the following formula 1:

$$S'=(\Sigma D^{-E}s)/(\Sigma D^{-E}) \tag{1}$$

where, E is provided for adjusting the degree of weighting, which can be a numerical value of 3, 5, etc. This numerical value will be appropriately selected, depending on the density of the data to be interpolated and/or dispersion of the voxel values. This interpolation can be done three-dimensionally. However, since the data are present densely in the direction of the reflection time (t), this interpolation is rather considered as interpolation of two-dimensional data within the x-y plane. Then, by effecting the interpolation at each reflection time (t) interval with using the obtained weighting value for the two-dimensional plane, the amount of calculation needed may be significantly reduced.

If the interpolation of three-dimensional voxel data is effected according to the above-described prior art, whether it is effected three-dimensionally or two-dimensionally, the following three problems occur.

Firstly, when another source voxel is present at a slightly distant location along the same direction from a deficient voxel to be interpolated toward a source voxel and these two source voxels have significantly differing data values (e.g. when their signs are different being positive or negative), the target value for the deficient voxel to be interpolated may be influenced also by the value of the distant source voxel.

Secondly, since the interpolation is effected in accordance with the distance alone, that is, without considering the direction, an extrapolation which generates a value far less reliable than obtained with an interpolation may also take place inadvertently.

Thirdly, if no source voxel at all is present in the vicinity of the deficient voxel, the interpolation will be effected anyway in a forcible manner by using the data value of a very distant source voxel, whereby the precision of the interpolated value will suffer considerably.

As a method devised for solving the first and second problems noted above, there is known a second conventional method. With this method, a Delaunay triangulation diagram is obtained by calculations from the two-dimensional distribution of source voxels in the x-y plane. Then, for a deficient voxel present within each triangle of the diagram, by using a data value of a source voxel present at the apex of this triangle, an interpolation operation is effected for the deficient voxel with a weighting corresponding to its distance therefrom. However, in order to obtain such Delaunay triangulation diagram by calculations, if 'n' units of source voxels are present in the two-dimensional distribution thereof within the x-y plane, a vast amount of calculations on the order of $n^2$ to $n^3$ will be necessary. Moreover, the third problem remains unsolved.

As a third prior art, the following method is also known. In this method, for displaying the three-dimensional voxel data, in the case of an underground buried object exploration for example, a wave signal by means of an electromagnetic wave or sonic wave is transmitted into the ground while movement over the ground surface and the signal reflected from the underground object is received. Then, based on the intensity of this reflected signal, three-dimensional voxel data are generated in the form of coordinates (x, y, t) consisting of the position (x, y) on the ground surface and the reflection time (t). Usually, this method needs an enormous amount of operation requiring much trouble and skill for generating a number of images from such three-dimensional voxel data obtained along a plurality of vertical or horizontal sections and then displaying them for comparison analysis thereof For instance, FIG. 26 shows an example of image display showing three-dimensional voxel data of a buried condition of FIG. 13 along a horizontal section. In the case of this section display, only a section of a fixed depth can be displayed. Then, in order to grasp the condition of an object buried at a different depth, another display will be needed with changing the depth.

In an attempt to overcome the problem of the third conventional art, The Institute of Electronics, Information and Communication Engineers: transactions: category D (Vol. J71-D No. 10, pp2002–2009) entitled: "Three-Dimensional Data Displaying Method for Under-Snow Radar System" proposes, as a fourth prior art, a method contemplating how to display the entire information of three-dimensional data in the form of a two-dimensional image.

FIGS. 27 through 29 illustrate display examples which were obtained by employing one mode, referred to as a surface display method, of the above-described fourth prior art described above for displaying the three-dimensional voxel data of the buried condition of FIG. 13. FIG. 27, FIG. 28 and FIG. 29 illustrate three examples in which the threshold value was varied from high, medium to low in the mentioned order in order to seek for an appropriate threshold value. From these, it may be understood that with high threshold value, the reflected signal becomes intermittent to impede the discrimination of the buried object, whereas with low threshold reflected signals of smaller intensities too can be displayed, but due to low S/N ratio of the reflected signals per se noise components are displayed also so as to deteriorate the visibility.

Next, FIG. 30 illustrates a display example which was obtained by employing another mode, referred to as an integration method, of the above-described fourth prior art which has been conventionally employed in e.g. ultrasonic diagnosis, for the same three-dimensional voxel data of the buried condition of FIG. 13 in the axis direction of reflection time (t). In this case too, since the S/N ratio of the reflected signals per se is low and also the area of the buried object is rather small relative to the entire exploration area, there occurs reduction in the image contrast due to the effect of integration, thus the visibility is again deteriorated. In addition to these methods, a difference addition method, a product sum method, etc. have also been proposed. However, since these methods employ difference from an adjacent value, there occurs the problem of enhancement of fine noises in the case of data of low S/N ratio.

The present invention has been made in view of the above-described state of the art. Its first object is to detect location of an underground buried object with high S/N ratio through effective interaction between a three-dimensional processing using a value of a neighboring section (voxel) and an manual operation. The second object of the invention is to provide a method or means which affords easy interpolation of a deficient voxel when such voxel deficient in data is present in three-dimensional voxel data so as to enable high-efficiency and high-precision detection of location of the underground buried object. The third object of the invention is to provide a method and an apparatus for displaying three-dimensional voxel data with low SIN ratio by means of a simple two-dimensional image display so as to allow easier and more accurate grasp of an object or the like present within a medium.

DISCLOSURE OF THE INVENTION

For accomplishing the first object note above, a three-dimensional exploring method relating to the present invention is characterized by the first through seventh characterizing features as follows.

According to the first charactelizing feature, in a three-dimensional exploring method for finding location of an object present within a medium by sequentially effecting an transmitting/receiving step of transmitting a wave signal by means of an electromagnetic wave or sonic wave into the medium and receiving the signal reflected from the object within the medium in the course of movement over the surface of the medium and a three-dimensional voxel data generating step of generating three-dimensional voxel data in the form of coordinates (x, y, t) consisting of a position (x, y) on the medium surface and a reflection time (t) based on intensity of the reflected signal; the method comprising: a maximum-magnitude extracting step of extracting, from the three-dimensional voxel data generated by the three-dimensional data generating step, a maximum value of the magnitude of the amplitude value and a reflection time $t_{MAX}$ providing the maximum value in the direction of reflection time (t) axis for each position (x, y) on the medium surface; a plane-locating step of locating, on an x-y plane of a predetermined reflection time (t), said maximum value and said reflection time $t_{MAX}$ extracted at said maximum-magnitude extracting step, respectively; an object-voxel selecting step at which said x-y plane having said maximum value located thereon is displayed and a coordinate point is designated on said displayed plane in accordance with a manual input operation, so that one or more object voxels are selected by specifying them with said designated coordinate point and said reflection time $t_{MAX}$ associated therewith; a binarizing step of extracting a candidate voxel group consisting of a plurality of voxels having amplitude values of positive or negative polarity and having magnitudes greater than a predetermined threshold and interconnected with each other; and a connecting/composing step of extracting, from the candidate voxel group extracted by the binarizing step, a connection-candidate voxel group to be connected to the object voxels selected by the object voxel selecting step and connecting said connection-candidate voxel group with said object voxels thereby to compose an object voxel group.

With the above-described characterizing feature, by executing the object voxel selecting step, the binarizing step and the connecting/composing step, from the candidate voxel group including a noise region comprised of unwanted reflected signals or the like having smaller reflected signal intensities, hence and having low likelihood of being the reflected signals from the object, the connection-candidate voxel group to be connected to the object voxels having high likelihood of being the reflected signals from the object is singled out and this group is connected and combined with the object voxels thereby to compose the object voxel group. With this, even when the threshold is set low, the large amount of noise region necessarily resulting therefrom can be effectively eliminated as being distinct from the object voxel group. Then, by simply setting the threshold higher, it is possible to prevent unwanted loss of the object voxel having higher likelihood of being a reflected signal from the object. Consequently, the exploration at a high S/N ratio is made possible.

Further, even in the case when a change in the exploring location leads to significant change in the reflected signal intensity, by first manually selecting the object voxel which represents a portion of the target object, the object voxel group connected continuously therefrom may be appropriately extracted, so that such continuously extending object as a buried pipe can be detected.

In addition, with this characterizing feature, when the object voxel(s) is (are) selected from the three-dimensional voxel data, the voxel to be designated is limited on the predetermined section. Thus, the object-voxel selecting step may be readily executed by means of a two-dimensional computer image display using a conventional CRT, a liquid crystal panel or the like and a manual computer input operation such as a cursor operation from a mouse or keyboard.

In addition, with the above characterizing feature, from the three-dimensional voxel data, the maximum value of the magnitude of the amplitude value and the associated reflection time $t_{MAX}$ are extracted and these maximum value and reflection time $t_{MAX}$ extracted for each position (x, y) on the medium surface are located respectively on the predetermined x-y plane inside or outside the three-dimensional voxel data, so that a section display may be provided for a maximum value of each position (x, y) on the medium surface. With this single section display (the x-y plane display), and, without effecting a plurality of section displays for various depths (reflection times (t)), the two-dimensional layout of a buried object at any depth can be grasped, thereby to allow easy and speedy selection of the object voxels, that is, extraction of the buried object.

Moreover, since such connecting/composing step can be carried out three-dimensionally, effective exploration result can be obtained also for a buried pipe or the like which is not oriented in the direction perpendicular to the scanning direction of the apparatus.

According to the second characterizing feature, the predetermined threshold utilized by the binarizing step is set based on the amplitude value of the object voxel selected by the object voxel selecting step.

Incidentally, the reflected signal intensity varies in accordance with the distance from the object to the surface of the medium or with the burying depth in the case of a buried object. Therefore, for exploring an area of shorter distance, it is necessary to set the threshold higher so as to eliminate the noise components effectively. Conversely, for exploring an area of longer distance, it is necessary to set the threshold lower to prevent loss of the object voxel.

Accordingly, with the second characterizing feature described above, the predetermined threshold utilized at the binarizing step is set based on the amplitude value of the object voxel selected by the object voxel selecting step. Hence, if the amplitude value of the object voxel is large, this is interpreted to indicate a short distance from the object to the medium surface, so that the threshold is set high correspondingly. The reverse setting thereof is also possible. As a result, with the selection of object voxel, the threshold can be set appropriately for the purpose of high S/N ratio extraction of the object corresponding to this object voxel. Moreover, this setting of threshold can be automated.

Moreover, in case the polarity of the candidate voxel group at the binarizing step is set in agreement with the polarity of the amplitude value of the object voxel, the threshold needs to be changed in accordance with this polarity. For instance, even when the zero value of the amplitude value is offset, the threshold can be appropriately adjusted based on the polarity of the amplitude value of the object voxel.

According to the third characterizing feature, in addition to the first characterizing feature described above, at the object voxel selecting step, said one or more object voxels are selected by substituting, for said designated coordinate point, a coordinate point which is present adjacent said designated coordinate point and which has the same polarity as the designated coordinate point and an amplitude value of the maximum magnitude.

With the above characterizing feature, when selecting the object voxel from the three-dimensional voxel data, if e.g., an operator errs in the computer input operation using a mouse or the like, thus failing to designate the correct object voxel and erroneously designating an adjacent voxel instead, it is still possible to select the correct object voxel having strong reflected signal intensity to be designated.

According to the fourth characterizing feature, the method effects a synthetic aperture operation or a migration operation on said three-dimensional voxel data or said candidate-voxel group or on said object voxel group.

With the above feature, by effecting the synthetic aperture operation or migration operation, it is possible to improve resolution within a plane (x, y) parallel to the medium surface.

In the above, if the synthetic aperture operation or migration operation is effected on the source three-dimensional voxel data consisting of raw data of the reflected signals, the three-dimensional voxel data comprise data which can approximate e.g. the buried condition of the object (i.e. information converted into the depth scale). So that, the analysis may proceed by setting the threshold with reference to the data, thus improving the convenience of use.

According to the fifth characterizing feature, at said three-dimensional voxel data generating step, a Wiener filtering operation or an amplitude adjusting operation is effected on the three-dimensional voxel data in the direction of the reflection time (t) axis, and the source three-dimensional voxel data before the processing is replaced by the processed data.

With the above characterizing feature, by effecting the Wiener filtering operation, the resolution in the direction of reflection time (t) axis may be improved. Also, by effecting the amplitude adjusting operation, amplitude of a weak reflected signal having a long reflection time can be enhanced.

For accomplishing the first object noted above, a three-dimensional exploring apparatus relating to the present invention has the sixth characterizing feature as follows.

According to the sixth characterizing feature, a three-dimensional exploring apparatus for finding location of an object present within a medium comprising; transmitting/receiving means for transmitting a wave signal by means of an electromagnetic wave or sonic wave into the medium and receiving the signal reflected from the object within the medium in the course of movement over the surface of the medium and three-dimensional voxel data generating means for generating three-dimensional voxel data in the form of coordinates (x, y, t) consisting of a position (x, y) on the medium surface and a reflection time (t) based on intensity of the reflected signal; wherein the apparatus further comprises: maximum-magnitude extracting means for extracting, from said three-dimensional voxel data generated by the three-dimensional voxel data generating means, a maximum magnitude value of the amplitude value and a reflection time $t_{MAX}$ providing the maximum value in the direction of the reflection time (t) axis for each position (x, y) on the medium surface; plane-locating means for locating, respectively on an x-y plane of a predetermined reflection time (t), said maximum value and said reflection time $t_{MAX}$ extracted by the maximum-magnitude extracting means; an object-voxel selecting means for displaying said x-y plane having said maximum value located thereon is displayed and designating a coordinate point on said displayed plane in accordance with a manual input operation, so that one or more object voxels are selected by specifying them with said designated coordinate point and said reflection time $t_{MAX}$ associated therewith; binarizing means for extracting a candidate voxel group consisting of a plurality of voxels having amplitude values of positive or negative polarity and magnitudes greater than a predetermined threshold and interconnected with each other; and connecting/composing means for extracting, from the candidate voxel group extracted by the binarizing means, a connection-candidate voxel group to be connected to the object voxels selected by the object voxel selecting means and combining said connection-candidate voxel group with said object voxels thereby to compose an object voxel group.

With the above-described characterizing feature, for the three-dimensional voxel data generated by the three-dimensional voxel data generating means, from the candidate voxel group including a noise region comprised of unwanted reflected signals or the like having smaller reflected signal intensities, hence and having low likelihood of being the reflected signals from the object, the connecting/composing means extracts only the connection-candidate voxel group to be connected to the object voxels selected by the object voxel selecting means and having high likelihood of being the reflected signals from the object and then connects and combines this group with the object voxels to compose the object voxel group. With this feature, even when the threshold is set low, the large amount of noise region necessarily resulting therefrom can be effectively eliminated as being distinct from the object voxel group. Thus, by simply setting the threshold higher, it is possible to prevent unwanted loss of the object voxel having higher likelihood of being a reflected signal from the object, so that the exploration at a high SIN ratio is made possible.

Moreover, with this characterizing feature, the three-dimensional exploring method having the above-described first characterizing feature of the invention can be employed. Therefore, the function/effect of the first characterizing feature can be achieved.

In addition, with this characterizing feature, by the section displaying means, it is possible to manually select and display a desired section of the three-dimensional voxel data generated by the three-dimensional voxel data generating means. Further, by the section coordinate-point designating means, it is possible to manually designate a coordinate point on the displayed section in accordance with a predetermined manual operation. Thus, when the object voxel(s) is (are) selected from the three-dimensional voxel data, it is possible to limit the voxel to be designated on the predetermined section. Therefore, the object-voxel selecting step may be readily executed by means of a two-dimensional computer image display using a conventional CRT, a liquid crystal display panel or the like and a manual computer input operation such as a cursor operation from a mouse or keyboard with reference to the display.

Further, as the x-y plane having the maximum value located thereon relating to the first characterizing feature is disposed inside or outside the three-dimensional voxel data, this plane is either included within the three-dimensional voxel data as a portion thereof, or serves to substantively extend the area of the three-dimensional voxel data in the direction of the reflection time (t) axis. Accordingly, this x-y plane having the maximum value located thereon is displayed as one section of the three-dimensional voxel data by the section displaying means.

A three-dimensional exploring method for accomplishing the second object relating to the present invention has the seventh or eighth characterizing feature as follows.

According to the seventh characterizing feature, in a three-dimensional exploring method for finding location of an object present within a medium by sequentially effecting an transmitting/receiving step of transmitting a wave signal by means of an electromagnetic wave or sonic wave into the medium and receiving the signal reflected from the object within the medium in the course of movement over the surface of the medium and a three-dimensional voxel data generating step of generating three-dimensional voxel data in the form of coordinates (x, y, t) consisting of a position (x, y) on the medium surface and a reflection time (t) based on intensity of the reflected signal, when the three-dimensional voxel data generated by the three-dimensional voxel data generating step contains a voxel deficient in data, the method effects, on said deficient voxel, a one-dimensional linear interpolation step of effecting a one-dimensional linear interpolation in a predetermined direction in an x-y plane including said deficient voxel when a distance along which the deficient voxels are present consecutively is shorter than a wavelength of the wave signal within said medium.

With this characterizing feature, the one-dimensional linear interpolation linearly interpolates between two source voxels for interpolating the deficient voxel therebetween. Therefore, even when another source voxel is present in the same direction as one nearer source voxel from the deficient voxel, the effect of the interpolation can be entirely free from influence from the data value of the distant source voxel. By the same operational principle, an extrapolation which is far less reliable will not be effected inadvertently. Further, supposing 'n' units of source voxels are present within the x-y plane i.e. a two-dimensional plane, then, the amount of calculation needed will be only on the order of (n). As a result, the processing time can be significantly reduced.

Consequently, a deficient voxel can be interpolated at high speed while the reliability of the interpolated value is maintained to an appropriate degree. Thus, in a situation where it is difficult to generate a complete set of three-dimensional voxel data due to certain restrictions present on the medium surface, highly efficient and highly precise exploration of a buried object is still possible.

In addition, with this characterizing feature, it is possible to appropriately restrict execution of the interpolating operation between two source voxels which are too far apart from each other to ensure linear interpolation with high precision. As a result, it becomes possible to avoid forcible execution of interpolation with poor precision. And, a deficient voxel present between such source voxels can be recognized as such for indicating it as un-measurable region dearly and this indication can help improve the exploration precision at the measurable region. Further, if this feature is combined with the eighth feature described above, since there can be a case where the one-dimensional linear interpolation is impossible in one direction but possible in another direction, it becomes possible to avoid forcible execution of low-precision interpolation, thereby improving the exploration precision.

Incidentally, the reason why the wavelength of the wave signal within the medium is employed for the judgement whether to effect the one-dimensional linear interpolation or not is based mostly on the experiments.

According to the eighth characterizing feature, said linear interpolation step is effected for two or more times with varying the direction of the one-dimensional linear interpolation.

With this charactelizing,feature, even when the two-dimensional distribution of source voxels within the x-y plane is rather random, the interpolation can be done in a sufficiently dense manner to interpolate all of the deficient voxels in the end.

The characterizing feature of a three-dimensional exploring apparatus for accomplishing the second object is the ninth characterizing feature as follows.

According to the ninth characterizing feature, a three-dimensional exploring apparatus for finding location of an object present within a medium, including transmitting/receiving means for transmitting a wave signal by means of an electromagnetic wave or sonic wave into the medium and receiving the signal reflected from the object within the medium in the course of movement over the surface of the medium and three-dimensional voxel data generating means for generating three-dimensional voxel data in the form of coordinates (x, y, t) consisting of a position (x, y) on the medium surface and a reflection time (t) based on intensity of the reflected signal, the apparatus comprises linear interpolating means for effecting, when the three-dimensional voxel data generated by the three-dimensional voxel data generating step contains a voxel deficient in data, on said deficient voxel, a one-dimensional linear interpolation in a predetermined direction in an x-y plane including said deficient voxel when a distance along which the deficient voxels are present consecutively is shorter than a wavelength of the wave signal within said medium.

With this characterizing feature, the linear interpolating means effects a one-dimensional linear interpolation in a predetermined direction on the x-y plane, thus executing the linear interpolation step of the above-described tenth characterizing feature. Alternately, the linear interpolating means effects a one-dimensional linear interpolation in a first direction on the x-y plane and effects again another one-dimensional linear interpolation with changing the direction of effecting the linear interpolation, so that with repeated execution of linear interpolating operations in the same manner as needed, the linear interpolation step of the above-described eighth characterizing feature is effected. In these manners, the same functions/effects of the seventh or seventh and eighth characterizing features can be achieved.

For accomplishing the third object described above, a three-dimensional voxel data displaying method relating to the present invention has the tenth through sixteenth characterizing features as follows.

According to the tenth characterizing feature, in a method of displaying three-dimensional voxel data generated in the form of coordinates (x, y, t) consisting of a position (x, y) on a medium surface and a reflection time (t) based on intensity of a reflected signal of a wave signal transmitted from a surface of a medium into the medium and reflected therefrom, the method executes: for said three-dimensional voxel data, a maximum-magnitude extracting step of extracting a maximum magnitude value of the amplitude value in the direction of the reflection time (t) axis for each position (x, y) on the medium surface, a plane-locating step of locating said maximum magnitude value on a predetermined plane for each position (x, y) on the medium surface extracted by said maximum-value extracting step, and a plane displaying step of displaying said maximum magnitude value located on said predetermined plane.

With the above characterizing feature, for the three-dimensional voxel data, a maximum magnitude value of the amplitude value in the direction of reflection time (t) axis is extracted for each position (x, y) on the medium surface and this maximum magnitude value for each position (x, y) on each medium surface is located and displayed on a predetermined plane. Accordingly, even when the S/N ratio of the three-dimensional voxel data is low and the area of the object within the medium is relatively small compared with the entire area to be explored, high-contrast display may be provided as long as areas of strong reflected signals exist in a localized manner. So that, the two-dimensional layout of the object can be readily grasped with high visibility.

According to the eleventh characterizing feature, a maximum value and a minimum value are obtained from the maximum magnitude values extracted at said maximum magnitude extracting step and the maximum magnitude values are normalized such that said maximum value and said minimum value respectively become an upper limit and a lower limit of display scale.

With this characterizing feature, in locating and displaying the maximum magnitude values for each position (x, y) on each medium surface on the predetermined plane, the maximum value and the minimum value are obtained from those maximum magnitude values. Then, the maximum magnitude values are normalized such that said maximum value and said minimum value respectively become an upper limit and a lower limit of display scale. Therefore, the contrast may be further enhanced for additional improvement of the visibility.

According to the twelfth characterizing feature, at said maximum magnitude extracting step for extracting the maximum magnitude values for each position (x, y) on the medium surface, a reflection time $t_{MAX}$ providing the maximum magnitude values is also extracted.

With this characterizing feature, at the maximum magnitude extracting step for extracting the maximum magnitude values of the amplitude value in the direction of reflection time (t) axis for each position (x, y) on the medium surface, the reflection time they providing the maximum magnitude values is also extracted. Hence, it becomes readily possible to grasp at which reflection time (t) (corresponding to the distance from the medium surface, or to the burying depth in the case of underground buried object exploration) the object area transmitting strong signals is present.

According to the thirteenth characterizing feature, at the maximum magnitude extracting step for extracting the maximum magnitude values of the amplitude value in the direction of reflection time (t) axis for each position (x, y) on the medium surface, any amplitude values outside a predetermined range of reflection time (t) are excluded.

With this characterizing feature, in extracting the maximum magnitude values of the amplitude values in the direction of reflection time (t) axis for each position (x, y) on the medium surface, any amplitude values outside a predetermined range of reflection time (t) are excluded. Therefore, it becomes possible to exclude any area, such as an area near the ground surface or underground water surface in the case of an underground exploration, where the reflected signal intensity within the medium becomes extremely high. As a result, it becomes possible to improve the visibility for the area of the object inside the medium (the buried object area in the case of underground exploration).

According to the fourteenth characterizing feature, at the maximum magnitude extracting step for extracting the maximum magnitude values of the amplitude values in the direction of reflection time (t) axis for each position (x, y) on the medium surface, only either voxels whose amplitude value polarity is positive or negative are used for the extracting step.

With this characterizing feature, in extracting the maximum magnitude values of the amplitude values in the direction of reflection time (t) axis for each position (x, y) on the medium surface, only either voxels whose amplitude value polarity is positive or negative are used for this extracting step. So that, the extracting step is effected for only those amplitude values having a polarity of higher S/N ratio of the reflected signals from the object in the medium., Consequently, the visibility of the area of the object in the medium can be improved. This feature is provided in consideration of the fact that in the case of underground buried object exploration, the polarity of the reflection coefficient of the transmitted signal from the buried object varies depending on the kind of material forming the buried object. For instance, the reflection coefficient is negative for a metal pipe and the coefficient is positive for a resin pipe or hollow cave.

According to the fifteenth characterizing feature, prior to the maximum magnitude extracting step, a synthetic aperture operation or a migration operation is effected on three-dimensional voxel data consisting of the reflected signal intensity so as to generate said three-dimensional voxel data to be displayed.

With this characterizing feature, by effecting the synthetic aperture operation or migration operation, the resolution within an x-y plane parallel to the medium surface may be improved. Further, since the three-dimensional voxel data obtained by effecting the synthetic aperture operation or migration operation on the source three-dimensional voxel data consisting of raw data of the reflected signals can become data which approximate e.g. the buried condition of the object (i.e. information converted into the depth scale). Therefore, the visibility can be further improved.

According to the sixteenth characterizing feature, said synthetic aperture operation or migration operation is effected at various propagation velocities in various kinds of medium to obtain a set of the three-dimensional voxel data for each propagation, said maximum magnitude extracting step and said plane locating step are effected for each set of three-dimensional voxel data associated with each propagation velocity, and a processing result at an appropriate propagation velocity is selected based on the displayed results of the sets of the three-dimensional voxel data at said plane displaying step for each propagation velocity.

With this characterizing feature, the synthetic aperture operation or migration operation is effected using various propagation velocities of various kinds of medium and each set of three-dimensional voxel data generated for each propagation velocity is displayed at the plane displaying step for evaluation of focus condition of the displayed result. With these, even when the propagation velocity in the medium is unknown, it is still readily possible to select the processing result at an appropriate propagation velocity. As a result, high resolution within the x-y plane parallel to the medium surface may be assured.

For accomplishing the third object noted above, a three-dimensional voxel data displaying apparatus relating to the present invention has the seventeenth characterizing feature as follows.

According to the seventeenth characterizing feature, an apparatus for displaying three-dimensional voxel data generated in the form of coordinates (x, y, t) consisting of a position (x, y) on a medium surface and a reflection time (t) based on intensity of a reflected signal of a wave signal transmitted from the surface medium into the medium and reflected therefrom, the apparatus comprises: maximum-magnitude extracting means for extracting from said three-dimensional voxel data, a maximum magnitude value of the amplitude value in the direction of the reflection time (t) axis for each position (x, y) on the medium surface; plane-locating means for locating said maximum magnitude value on a predetermined plane for each position (x, y) on the medium surface extracted by said maximum-value extracting means; and plane displaying means for displaying said maximum magnitude value located on said predetermined plane.

This three-dimensional voxel data displaying apparatus can be employed for carrying out the three-dimensional voxel data displaying method having the above-described tenth through sixteenth and its basic functions/effects are identical to the functions/effects of the three-dimensional voxel data displaying method having the above-described tenth characterizing feature.

BRIEF DESCRIPTION OF THE DRAWINGS

FIG. 2 is an explanatory diagram illustrating waveforms of transmitted signals and received signals, FIG. 6 is an explanatory view schematically illustrating the exploration data (source three-dimensional voxel data before a migration operation) employed in the data processing procedure of the first embodiment, FIG. 8 is an explanatory view schematically illustrating the processing results (section of the three-dimensional voxel data after the migration operation) obtained from the exploration data used in the data processing procedure of the first embodiment, FIG. 9 is an explanatory view showing attribute values of object voxels obtained from the exploration data used in the data processing procedure of the first embodiment, FIG. 10 is an explanatory view schematically showing processing results (extracted object voxel groups) obtained from the exploration data used in the data processing procedure of the first embodiment, FIG. 11 is a descriptive view schematically showing processing results (sections obtained when a maximum-value extracting step and a plane-locating step were effected on the three-dimensional voxel data after a migration operation) obtained from the exploration data used in the data processing procedure according to another mode of the first embodiment.

BEST MODES OF EMBODYING THE INVENTION

Modes of embodying the present invention will be described next with reference to the drawings.

First Embodiment

Figure 1:
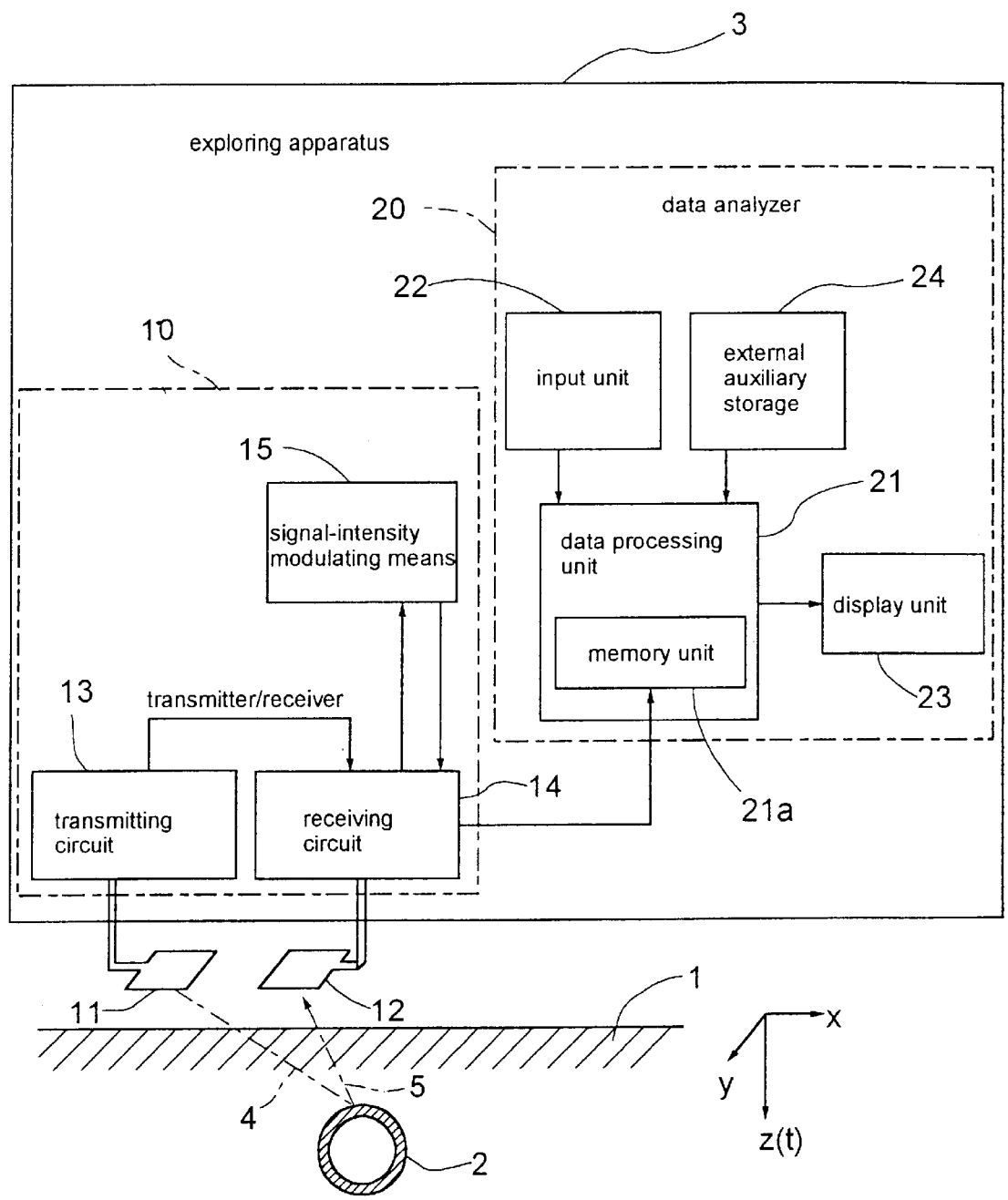
FIG. 1 is a block diagram of a three-dimensional exploring apparatus.

As shown in FIG. 1, a three-dimensional exploring apparatus relating to one embodiment of the present invention includes, as major components thereof, a transmitter/receiver 10 as transmitting/receiving means and a data analyzer 20 for processing signals obtained by the transmitter/receiver 10. The characterizing features of the present invention lie in the analyzing process effected in the data analyzer 20.

Figure 5:
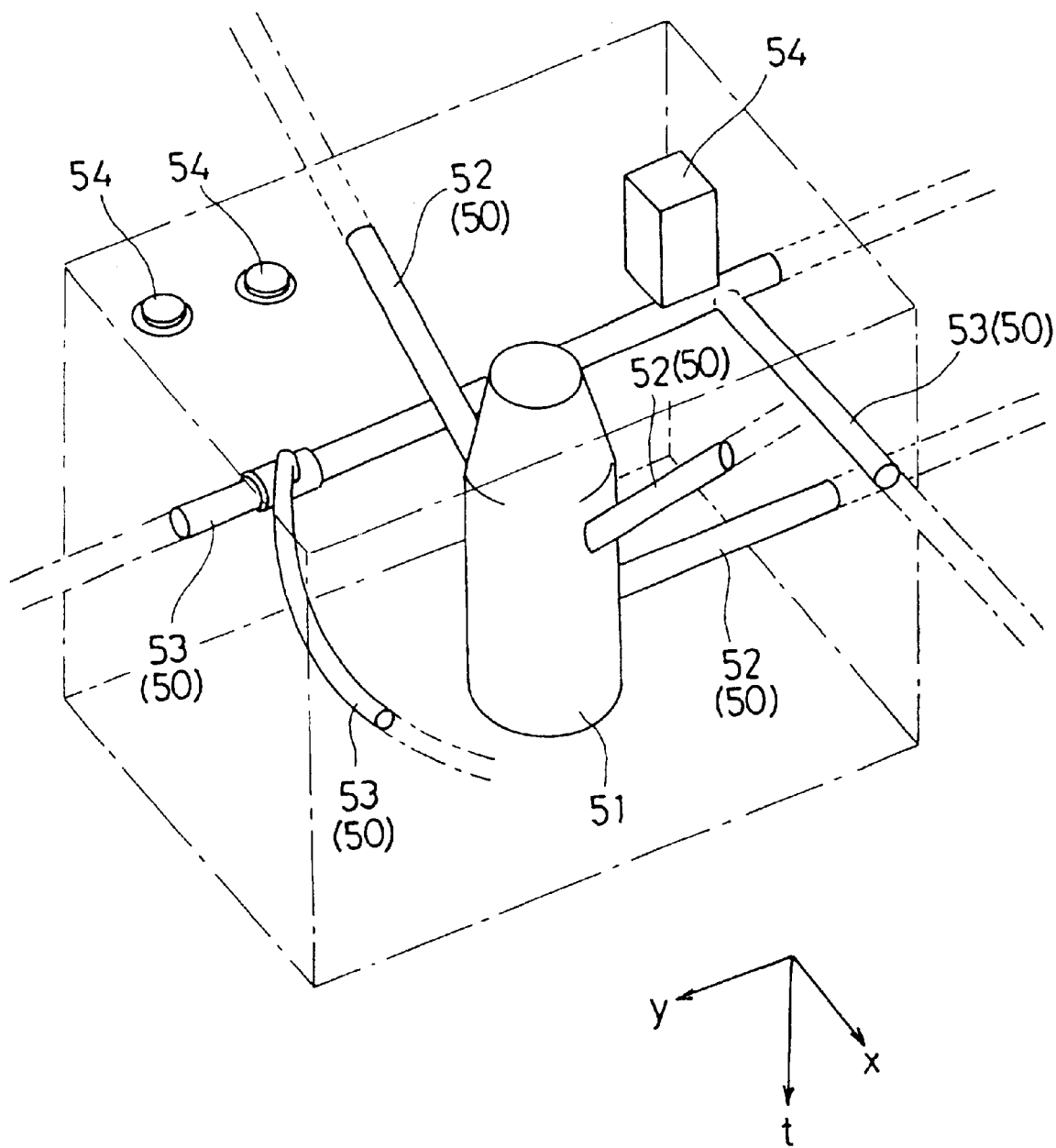
FIG. 5 is an explanatory view illustrating a buried condition from which exploration data employed in the data processing procedure of the first embodiment were obtained.
Figure 13:
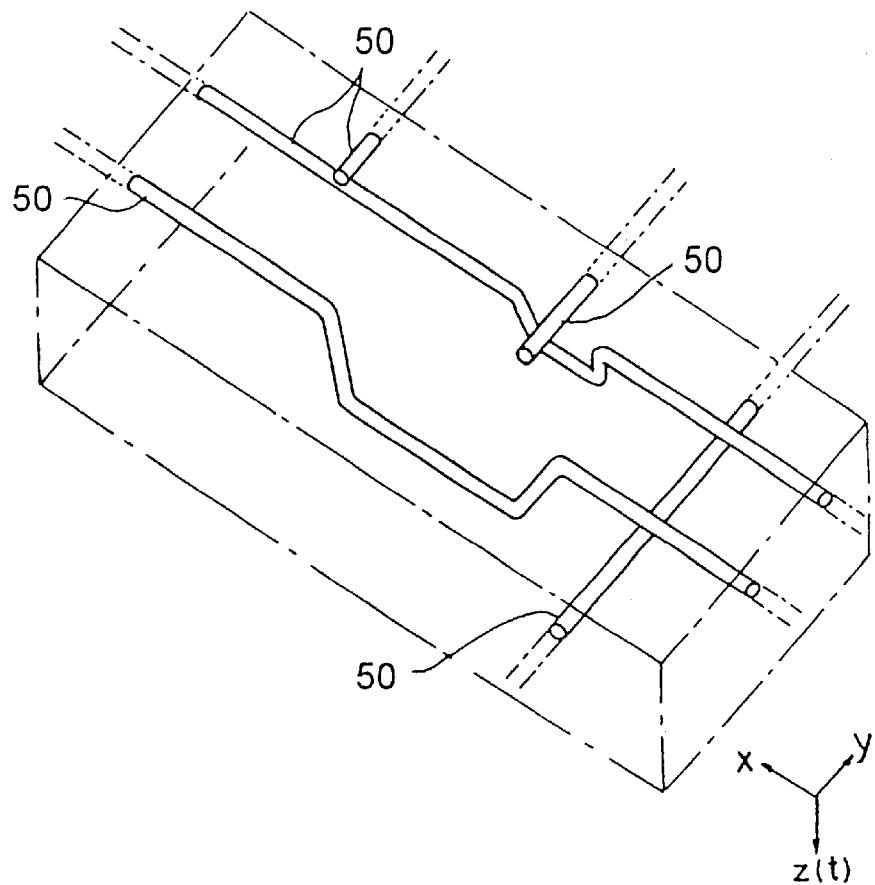
FIG. 13 is an explanatory view illustrating a buried condition obtained by using exploration data employed in the data processing procedures of the second and third embodiments.

As shown in FIG. 1, in a soil 1 as a medium, there is buried an object 2 such as a steel pipe for transporting a fluid such as a gas. The exploring apparatus 3 having the transmitter/receiver 10 and the data analyzer 20 explores the buried location of the object 2 while moving over the ground surface. The direction of this movement is the x direction in the example shown in FIG. 1. And, for obtaining three-dimensional voxel data as in the case with the present invention, after collecting data in the x direction, the apparatus is shifted by a predetermined amount in the y direction (front-to-back direction of FIG. 1) to collect data in the x direction again. By repeating this cycle, the apparatus sequentially collects a plurality of sets of data in the x direction. Incidentally, the object 2 shown in FIG. 1 is a schematic representation of an object to be explored. This represents, e.g. a portion of a buried pipe 50 buried in a certain condition as illustrated in FIG. 5 or FIG. 13 for example.

Referring to the transmitter/receiver 10, a transmitting circuit 13 generates a single pulse signal of e.g. 100 MHz to 1 GHz such as shown in FIG. 2(B)(1) and a transmitting antenna 11 emits and transmits this signal as an electromagnetic wave into the soil 1. For instance, if the apparatus is moved on the surface over the object 2 as illustrated in FIG. 2(A), an incident wave 4 of the electromagnetic wave emitted from the transmitting antenna 11 into the soil is reflected and scattered by the surface of the object 2, and a reflected wave 5 thereof is received by a receiving antenna 12. Then, a receiving circuit 14 demodulates and amplifies this into a received signal such as shown in FIG. 2 (B)(2) (in this figure, each single line corresponds to one of a plurality of received signals received at a certain fixed position with a time delay). The time difference (t) between the emission from the transmitting antenna 11 and the reception by the receiving antenna 12 (this substantially corresponds to the reflection time) is uniquely determined by a distance from the surface of the soil 1 to the object 2 and a relative dielectric constant (∈) of the soil 1 or the propagation velocity of the electromagnetic wave.

In the case of the example shown in FIG. 1, both the transmitting antenna 11 and the receiving antenna 12 are disposed in opposition to the ground with a predetermined distance relative thereto. The x-direction movement takes place to traverse the object 2.

As shown in FIG. 1, the transmitter/receiver 10 includes a signal-intensity modulating means 15 for modulating the gain of the amplifier of the receiving circuit 14 according to the time difference (t). Namely, the greater the time difference (t), the greater the loss in the pulse signal propagating in the soil 1, thus resulting in decrease in the intensity of the received signal. Then, the signal-intensity modulating means 15 compensates for such decreased intensity by the amplitude of the received signal, so as to obtain a received signal intensity distribution free from steep attenuation resulting from increase in the time difference (t), i.e., the reflection time (t). With this arrangement, it is possible to assure a signal intensity required by a subsequent signal processing.

Next, the data analyzer 20 to which the received signals are sent will be described with reference to FIGS. 1 and 3.

This data analyzer 20 includes a data processing unit 21 comprising a microcomputer, a semiconductor memory or the like, an input unit 22 comprising a mouse, a keyboard or the like for receiving an instruction from the outside and a display unit 23 comprising a CRT monitor, a liquid crystal display or the like for displaying image data or output results at each stage of the processing. The data analyzer 20 further includes an external auxiliary storage 24 comprising a magnetic disc or the like for storing the data or output results at each stage of the processing.

The above-described construction of the three-dimensional exploring apparatus is common also to the second and third embodiments described later. Next, features of the apparatus unique to the first embodiment for achieving the first object of the invention will be described.

Figure 3:
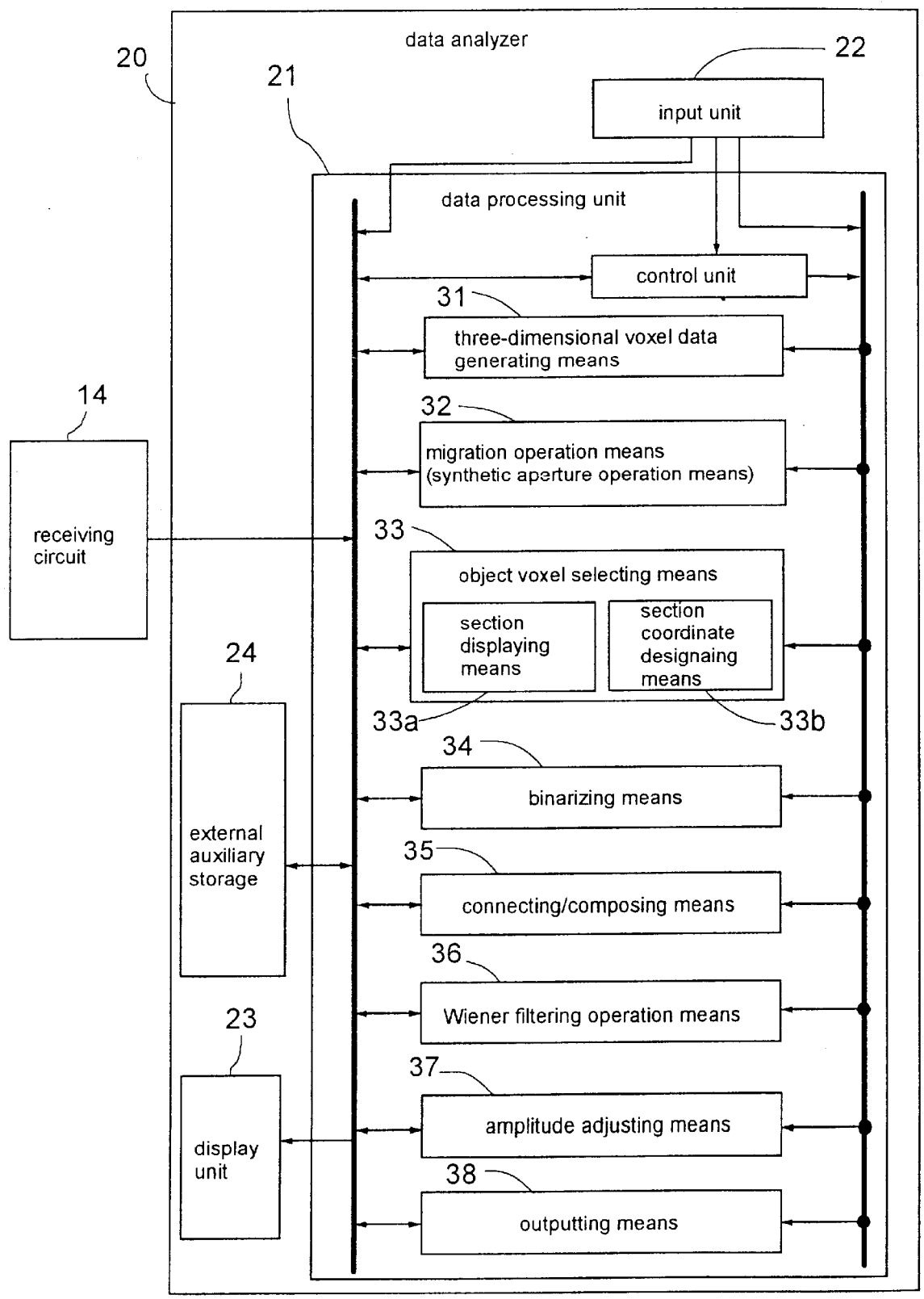
FIG. 3 is a functional block diagram of a data analyzer relating to a first embodiment.

As shown in FIG. 3, the data processing unit 21 includes a three-dimensional voxel data generating means 31 for editing and processing the received signals input from the receiving circuit 14 in terms of their relationship relative to the position (x, y) on the medium surface and the time (t).

This three-dimensional voxel data generating means 31 is provided for generating three-dimensional voxel data to be used in subsequent in the form of source three-dimensional voxel data (s) (x, y, t) which are generated directly from the received signal intensity (s) in terms of the functions of the position (x, y) on the medium surface and the time (t).

Further, when necessary, these source three-dimensional voxel data (s) (x, y, t) are subjected to a migration operation to be converted into new migration-processed three-dimensional voxel data (S) (x, y, t). As these sets of data both have a three-dimensional structure, these sets of data (s) (x, y, t) and (S) (x, y, t) both comprise a group of data generated as "three-dimensional voxel data" by the three-dimensional voxel data generating means 31.

Here, the "migration operation" refers to a known method for converting moving-direction relating information (space, depth=0, time information) obtained on the medium surface into information relating to the depth direction of the medium (i.e. information of space, depth, time=0) based on a wave equation representing wave propagation by using the Fourier transformation or the inverse Fourier transformation.

According to this method, in case only the x direction is to be considered as the spatial coordinate, suppose that x represents the observation line on the medium surface, z represents the depth having the positive values into the soil and t is the propagation time, and the wave field is represented as u (x, z, t), which is Fourier transformed into U (ξ, η, ω). Then, the migration method obtains the depth-wise field u (x, z, 0) (depth section) at time=0 from observed data u (x, 0, t) (radar image) obtained for t>0.

More particularly, the phase-shift method as one type of the migration method, effects the following operations.
1. A two-dimensional Fourier transformation for x and t is effected on the observed data to obtain U (ξ, 0, ω).
2. One line of a desired depth is obtained from U (ξ, 0, ω).
3. By repeating the calculation of 2 above while updating the depth, the entire depth section is obtained.

On the other hand, the F-K migration method, which is another type of the migration method, effects the following operations.
1. A two-dimensional Fourier transformation for x and t is effected on the observed data to obtain U (ξ, 0, ω).
2. A Fourier transformed value of the depth section on the frequency range is obtained.
3. On this value, a two-dimensional inverse Fourier transformation is effected for ξ and η to obtain u (x, z, 0).

In the manners described above, the section structure at t=0 can be obtained. In the above, the description was made regarding only the x direction as the spatial coordinate. However, the procedure can be effected also in similar manners when the both x direction and the y direction are to be considered.

For this purpose, the data processing unit 21 includes a migration operation means 32 capable of effecting a migration operation on the data obtained in the form of three-dimensional voxel data. Alternately, in place of the migration operation, a synthetic aperture operation, which is another known method, can be effected. In this case, the data processing unit will include a synthetic aperture operation means instead of the migration operation means 32. This alternative construction is denoted within a parenthesis in the figure.

Further, this data processing unit 21 includes: an object voxel selecting means 33 for selecting, with a manual operation, one or more object voxels from the three-dimensional voxel data S (x, y, t) generated by the three-dimensional voxel data generating means 31; a binarizing means 34 for extracting a candidate voxel group consisting of a plurality of voxels having amplitude values of positive or negative polarity and magnitudes greater than a predetermined threshold and interconnected with each other; a connecting/composing means 35 for extracting, from the candidate voxel group extracted by the binarizing means 34, a connection-candidate voxel group to be connected to the object voxels selected by the object voxel selecting means 33 and then connecting said connection-candidate voxel group with said object voxels thereby to compose an object voxel group; and an outputting means 38.

The object voxel selecting means 33 includes: a section displaying means 33a for selecting a desired section of the three-dimensional voxel data S (x, y, t) generated by the three-dimensional voxel data generating means 31 in response to a manual operation from the input unit 22 such as a mouse and then displaying this section on the display unit 23; and a section coordinate designating means 33b for designating a coordinate point on the displayed section in response to a manual operation on the input unit 22 such as a mouse, thereby to select the voxel at this coordinate point as an object voxel.

Figure 4:
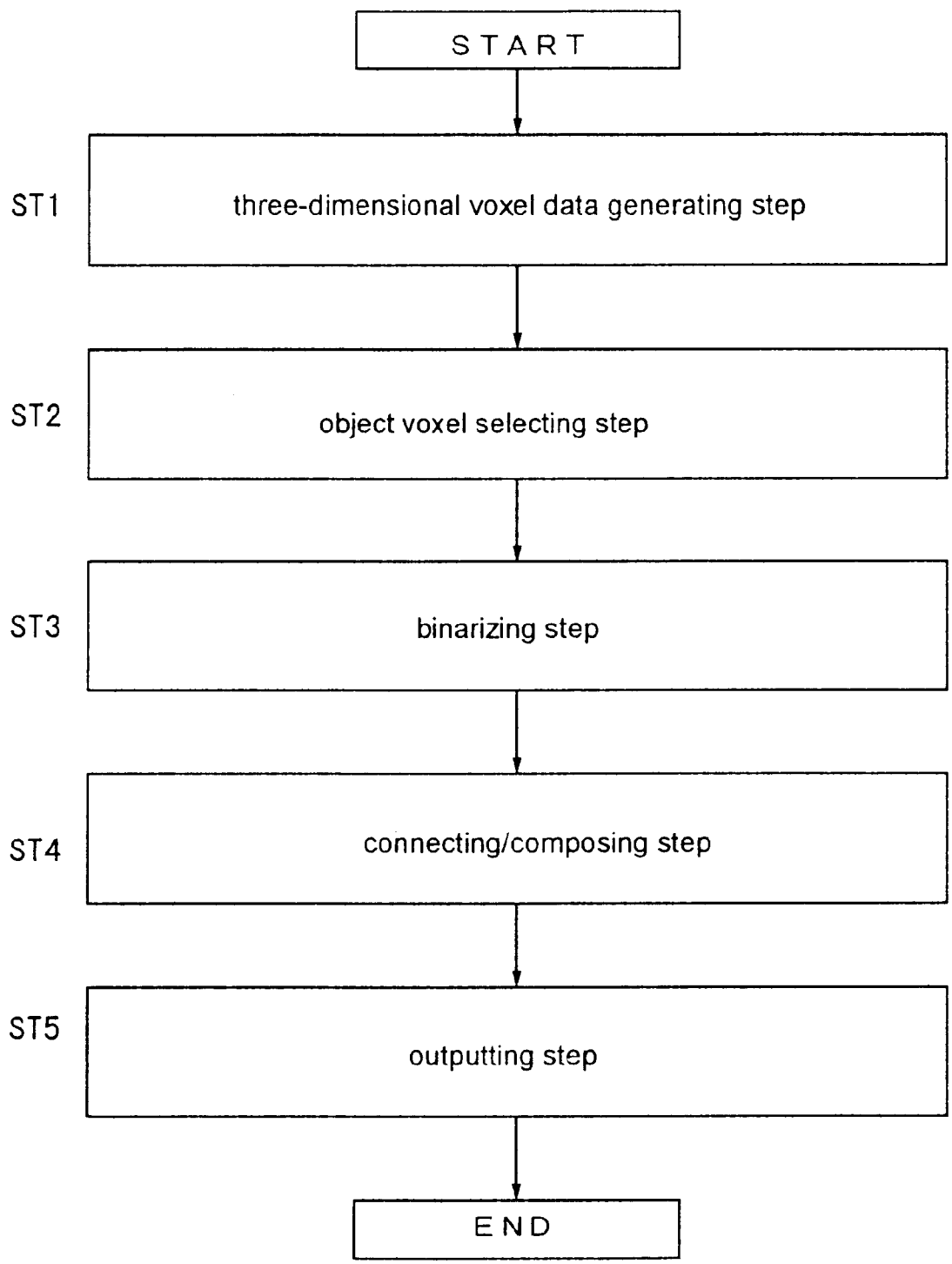
FIG. 4 is a flow chart illustrating a data processing procedure relating to the first embodiment.

Next, an embodiment of a three-dimensional exploring method relating to the present invention will be described with reference to the flow chart of FIG. 4 illustrating a typical data processing procedure effected by the data processing unit 21 of FIG. 4 and also to the processing results obtained by exploration of the buried condition shown in FIG. 5. Incidentally, in this buried condition of FIG. 5, pipes 52 connected to a manhole 51, buried pipes 50 such as pipes 53 extending about the pipes 52 and a block object 54 are all buried in the soil 1.

1. Three-dimensional Voxel Data Generating Step (ST1)

At this step, while the three-dimensional exploring apparatus 3 is moved, data are collected and these data are processed to generate the three-dimensional voxel data s (x, y, t) or S (x, y, t) to be used in the subsequent processing. More particularly, at this step, based on the digitized received signal intensity, a section image of the soil 1 including the objects is inputted as the source three-dimensional voxel data s (x, y, t) in the form of the coordinates (x, y, t) consisting of a position (x, y) of the antennas 11, 12 on the medium surface and a reflection time t of the reflected wave 5 from the object 2 (actually, the time period measured from the oscillation of a predetermined incident signal to the reception of the reflected signal by the receiving antenna). In this, the brightness of the received signal is displayed in one of multiple scales according to its intensity. A positive value of signal intensity (high brightness) is inputted as white, a negative value of signal intensity (low brightness) is inputted as black and a zero value of signal intensity is inputted as a halftone. Specifically, this scale is expressed as 8-bits (256) scale, with the scale value 128 representing an amplitude value 0 of the reflected signal intensity, scale values greater than 129 representing positive values of the amplitudes and scale values smaller than 127 representing negative values of the amplitudes. More particularly, the digitized received signal is stored in a predetermined area of a memory 21a inside the data processing unit as the multiple scales source three-dimensional voxel data s (x, y, t) such that the coordinates (x, y, t) determined by the position (x, y) on the medium surface and the reflection time (t) of the reflected wave 5 from the object 2 are encoded as an address signal by a quantization bit width which was used for the A/D conversion of this signal. FIG. 6 shows a processing result obtained by effecting a conventional binarizing processing on the source three-dimensional voxel data s (x, y, t) generated and stored in the above-described manner. Actually, all of the voxels within the area hold certain respective scale values.

Figure 7:
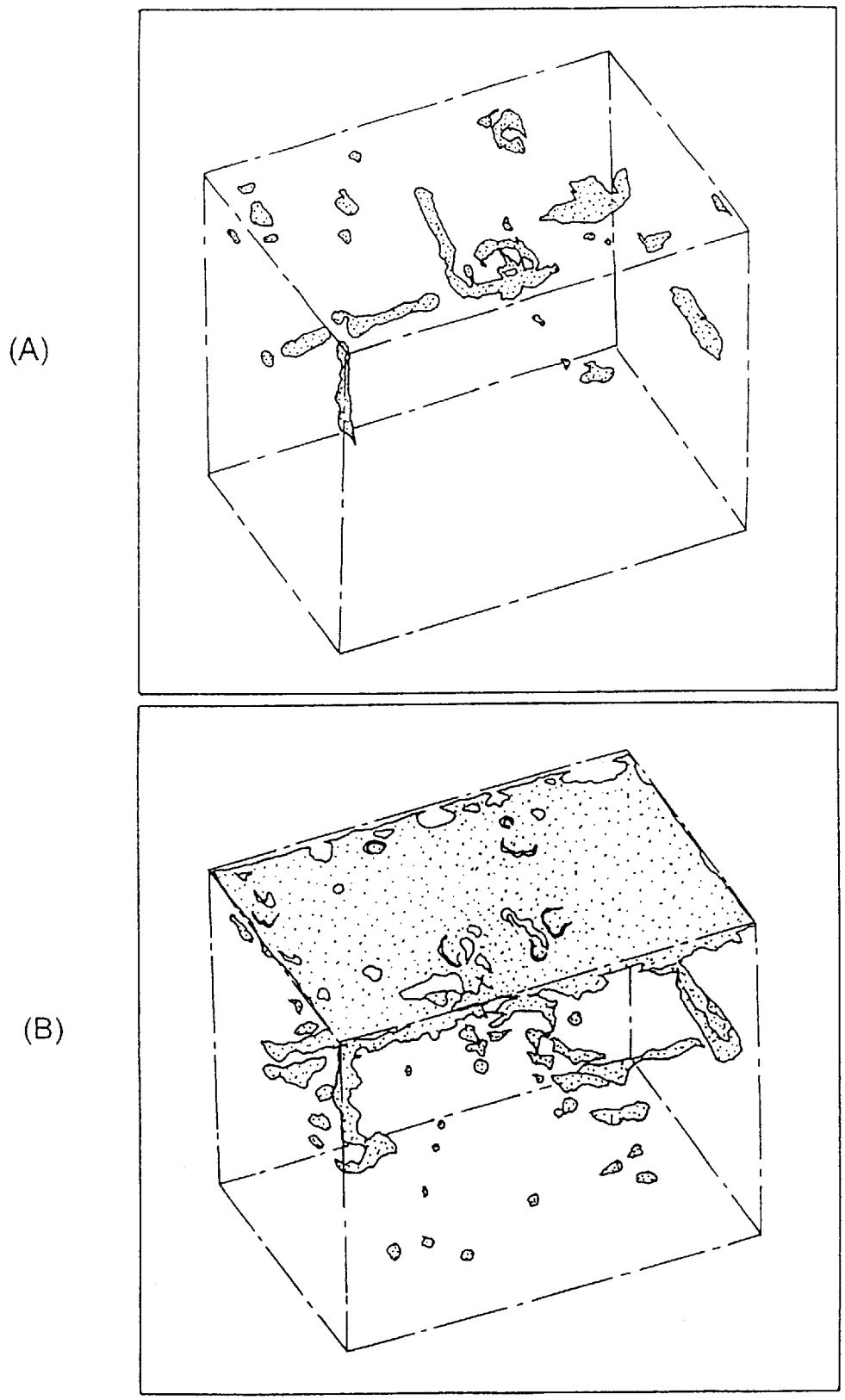
FIG. 7 is an explanatory view schematically illustrating results obtained by effecting a conventional binarizing operation on the exploration data (three-dimensional voxel data after the migration operation) used in the data processing procedure of the first embodiment.

Thereafter, the source three-dimensional voxel data s (x, y, t) obtained as above are subjected to the migration operation to be rendered into the three-dimensional voxel data S (x, y, t) which are used in the subsequent processing. FIG. 7 shows these three-dimensional voxel data S (x, y, t) obtained by effecting the migration operation on the source three-dimensional voxel data s (x, y, t). Incidentally, FIG. 7 is a schematic illustration of an actual image display. Also, although the three-dimensional voxel data S (x, y, t) in FIG. 7 are shown after the conventional binarizing operation thereof, actually all the voxels within the area hold certain respective scale values. Although FIG. 7 shows the case when the migration operation was effected, substantially identical processing result may be obtained when the synthetic aperture operation is effected.

FIG. 7(A) shows a case where the threshold for the binarizing operation was set to a relatively high scale value of 175 in order to observe the reflected signal from the manhole 51 which is located adjacent the ground surface. Whereas, FIG. 7(B) shows another case where the threshold for the binaiizmng operation was set to a relatively low scale value of 155 in order to observe the reflected signals from the buried pipes located deeper. From these, it may be understood that with such conventional binarizing operation, it is impossible to detect reflection signals of different depths at one time. That is, with a high threshold, a buried pipe deeply located cannot be detected, whereas with a low threshold, the noise region will increase so that the reflection signal from a buried object located near the ground surface becomes undetectable.

The three-dimensional voxel data S (x, y, t) obtained as above after the migration operation are substituted for the raw data s (x, y, t) and outputted by the three-dimensional voxel data generating means 31 for the subsequent processing.

2. Object Voxel Selecting Step (ST2)

As shown in FIGS. 8(A) and (B), the section displaying means 33a displays the migration-processed three-dimensional voxel data S (x, y, t) in an x-y plane of an appropriate reflection time $T_D$. Then, the operator moves a cursor to a certain position on this displayed section by means of a manual operation from the input unit 21 such as a mouse and then the section coordinate designating means 33b designates plane coordinates $(X_D, Y_D)$ on the section based on that cursor position. In the above procedure, the selecting operation of the reflection time $T_D$ can be carried out specifically by selecting the block of T1 (the reflection-time coordinate values of the first selected object block) in the coordinates table shown in FIG. 9 showing the respective coordinate values of the plurality of object voxels by means of a mouse or the like and inputting these values from the keyboard. Alternately, this operation is also possible by shifting the section up and down on the image display shown in FIG. 8(A) by means of a mouse operation for example. Here, FIG. 8(A) shows the section in a perspective view, and FIG. 8(B) shows the same section in a plan view as seen from the ground surface. Although the display is given in multiple scales, FIGS. 8(A) and (B) show the section only schematically with high-brightness portions being shown in white (the base color of the paper sheet) and the low-brightness portions being shown in black (high-density dots display).

Thereafter, the section coordinate designating means 33b searches a voxel(s) which is (are) located adjacent the voxel of the coordinates $(X_D, Y_D, T_D)$ selected and designated as above and designates the searched voxel(s) as an object voxel(s). In this process, the area of search is a square area containing ±6 voxels about the designated voxel within the X-Y plane at the reflection time $T_C$. The computer display image of FIG. 9 shows the coordinate values (Xi, Yi, Ti), i=1~10 and the scale values (MAX1~10) of 10 voxels searched and selected in the above manner.

Further, in the above embodiment, the section was displayed for the x-y plane and the search was effected within the predetermined square area within the x-y plane at the reflection time $T_D$. Alternately, the section display may be effected for the x-t plane or y-t plane or any other plane of a desired inclination. Further, the search area is not limited to such square area within the displayed section. Instead, this search may be effected within a rectangular solid or voxel area of any other desired shape. Moreover, under certain conditions such as when the operator is a skilled operator, the section coordinates designating means 33b can directly designate the selected and designated coordinates ($X_D$, $Y_D$, $T_D$) as the object voxels, without effecting the search operation.

3. Binarizing Step (ST3)

At this step, the binarizing means 34 extracts, from the migration-operated three-dimensional voxel data S (x, y, t), a candidate voxel group consisting of a plurality of interconnected voxels having amplitude values of positive or negative polarity and magnitudes greater than a predetermined threshold. Specifically, if the object voxel selected at the object voxel selecting step has a positive amplitude value, a group of candidate voxels having amplitude values greater than the threshold will be extracted. On the other hand, if the object voxel has a negative amplitude value, a group of candidate voxels having negative amplitude values whose magnitudes are greater than the threshold will be extracted. More particularly, if the selected voxel has a scale value of 200, this corresponds to an amplitude value of 72. Then, the threshold will be automatically set to the scale value of 164 so that its amplitude value becomes a half of the magnitude of the amplitude value of the object voxel. Further, if the selected object voxel has a scale value of 0, this corresponds to an amplitude value of −128. Then, the threshold will be automatically set to the scale value of 64 so that its amplitude value becomes a half of the magnitude of the amplitude value of this object voxel.

By automatically setting the threshold to be used in the binarizing operation based on the magnitude of the amplitude value of the object voxel as described above, the following effect can be achieved. Namely, when it is preferred to set a greater threshold suitable for use in extraction of candidate voxel group for a shallow buried area, such greater threshold can be automatically set because the magnitude of the amplitude of the object voxel selected in such area is naturally large. Conversely, for a deep buried area, a smaller threshold can be automatically set. In these manners, a threshold suitable for high S/N ratio extraction of the candidate voxel group is automatically set.

Further, it is also preferable to adapt this threshold to be variable depending on the results of other processing. For instance, the threshold may be retrospectively adjusted with reference to the result of the subsequent connecting/composing step, so that the calculation process from the binarizing step to the connecting/composing step can be effected again. Incidentally, such re-adjusted thresholds will be shown in the blocks (MIN 1~10) within the computer display image of FIG. 9.

4. Connecting/Composing Step (ST4)

At this step, the connecting/composing means 35 extracts, from the candidate voxel group extracted by the binarizing step, a connection-candidate voxel group to be connected to the object voxels selected by the object voxel selecting step and combining said connection-candidate voxel group with said object voxels thereby to compose an object voxel group.

Specifically, using the object voxel as the center or core, a connection-candidate voxel group which is located adjacent or encircles the object voxel is extracted in a round-robin manner and this extracted connection-candidate group is added to the object voxel group. If even a single voxel is added in the above process, then a new connection-candidate voxel group which is located adjacent the new object voxel group is extracted again in the round-robin manner and added to the new object voxel group. These operations are repeated until exhaustion of any new voxel to be added.

FIGS. 10(A) and (B) show an example of the object voxel group obtained by this connecting/composing step. From these figures, it may be seen that the detection extensively covers the buried object from shallow points through deep points clearly. Here, FIG. 10(B) is a displayed image showing the object voxel groups in a plan view as seen from the ground surface. Incidentally, FIG. 10 is a schematic representation of the actual displayed image made in the same manner as FIGS. 6 and 7.

5. Outputting Step (ST5)

By outputting the processed data obtained above, buried pipes may be explored dearly.

Next, other modes of the first embodiment will be described.

<1> Between the three-dimensional voxel data generating step and the object voxel selecting step, there are effected a maximum-value extracting step of extracting, from the three-dimensional voxel data generated by the three-dimensional voxel data generating step, a maximum value of the magnitude of the amplitude value and a reflection time $t_{MAX}$ providing the maximum value in the direction of reflection time (t) axis for each position (x, y) on the medium surface; and a plane-locating step of locating respectively said maximum value and said reflection time $t_{MAX}$ on x-y planes of reflection time: t=0 and t=85, that is, the uppermost plane and the lowermost plane of the three-dimensional voxel data.

And, without effecting the object voxel selecting step of the foregoing embodiment, as a modified object voxel selecting step, the section displaying means 33a displays the section for the x-y plane at t=0, and the operator moves the cursor on this displayed section by means of a manual operation from the input unit 21 such as a mouse and the section coordinates designating means 33b designates plane coordinates ($X_D$, $Y_D$) on this display based on the cursor position.

Next, the section coordinates designating means 33b searches a voxel which has a maximum value in the vicinity of the voxel selected by the designation and sets the coordinates of the obtained object voxel as (X1, Y1) (in the case of selecting the first one). Here, the area of search is a square area of ±6 voxels about the designated voxel within the X-Y plane at the reflection time t=0. Then, the value of $t_{MAX}$ stored at (X1, Y1, 85) is read and this is set as the value of reflection time T1. FIG. 11(A) shows the displayed section of t=0 in a perspective view, while FIG. 11(B) shows the same displayed section in a plan view as seen from the ground surface. Thereafter, using the finally obtained (X1, Y1, T1) as the object voxel, the process proceeds to the binarizing step. Incidentally, the finally obtained result here was identical to that shown in FIG. 10 in the foregoing embodiment.

<2> In the foregoing mode of embodiment, on the source three-dimensional voxel data s (x, y, t) after the amplitude adjustment, a migration operation was effected to obtain the three-dimensional voxel data to be used for the subsequent processing. As such operation, a synthetic aperture operation may be employed instead, as described hereinbefore.

Further, the migration operation or the synthetic aperture operation may be effected prior to the binarizing step after the source three-dimensional voxel data is obtained in the manner described above. Or, it may be effected even after the connecting/composing step.

In the foregoing mode of embodiment, in order to enhance a weak signal having a long reflection time in the (t) axis direction, the amplitude adjustment in the (t) axis direction was effected by the signal intensity modulating means 15 provided in the transmitter/receiver. Instead, this amplitude adjustment on the source three-dimensional voxel data may be done in a software-wise, by directly inputting the received signal (s) into the memory 21a as being assigned to the coordinates (x, y, t) in association with the processing by the signal intensity modulating means 15. With such amplitude adjustment, for the source three-dimensional voxel data s (x, y, t), an average is obtained in the (x, y) directions for each reflection time (t), so that the amplitude adjustment is effected (this is done by amplitude adjusting means 37) so as to avoid significant reduction in the received signal intensity in the (t) axis direction.

Further, as an operation for improving the resolution in the (t) axis direction, a Wiener filtering operation in the (t) axis direction may be cited.

That is, for binarizing processing of the source three-dimensional voxel data s (x, y, t) for example (when this information is used as the output of the three-dimensional voxel data generating step), at e.g., the last stage of the three-dimensional voxel data generating step, the source three-dimensional voxel data s (x, y, t) comprising the received signal intensity (s) corresponding to the coordinates (x, y, t) is subjected to the Wiener filtering operation in the (t) axis direction (this is done by a Wiener filtering operation means 36) and the subsequent process is effected on these processed three-dimensional voxel data.

This Wiener filter function according to the following scheme.

The filter is expressed by the formula 2:

$$W(t) = \int_{-\infty}^{\infty} v(\tau) h_1(t - \tau) d\tau \quad (2)$$

where W(t) is the waveform obtained by filtering the received signal v(t) with impulse response $h_1(t)$. Further, the Fourier transformation $H_1(f)$ of $h_1(t)$ in the formula 2 is given by the following formula (3);

$$H_1 = W_0 \frac{W_1^*(f)}{(1-\eta)W_0 + \eta|W_1(f)|^2} \quad 0 \leq \eta \leq 1 \quad (3)$$

where W1(f) is a Fourier transformation of a typical reflection waveform normally obtained. And, $W_0$ is a filter coefficient given by formula 4;

$$W_0 = \int_0^{fmax} |W_1(f)|^2 df \quad (4)$$

This Wiener filter is a filter whose filter characteristics vary with a parameters η which satisfies $0 \leq \eta \leq 1$. And, when η=1, it becomes an inverse filter (inverted filter). When η=0, it becomes a matched filter. In the case of the present invention, setting of η=0.5~0.9 approximately is preferred.

Furthermore, the processed three-dimensional voxel data after such Wiener filtering operation above may be subjected to the synthetic aperture operation or migration operation described above to generate the three-dimensional voxel data for use in the subsequent binarizing step and connecting/composing step.

Second Embodiment

Next, a second embodiment for achieving the second object of the present invention will be described.

The overall construction and functions of a three-dimensional exploring apparatus relating to the second embodiment are identical to those of the first embodiment and have already been described with reference to FIGS. 1–3 and therefore they will not be described here.

Figure 12:
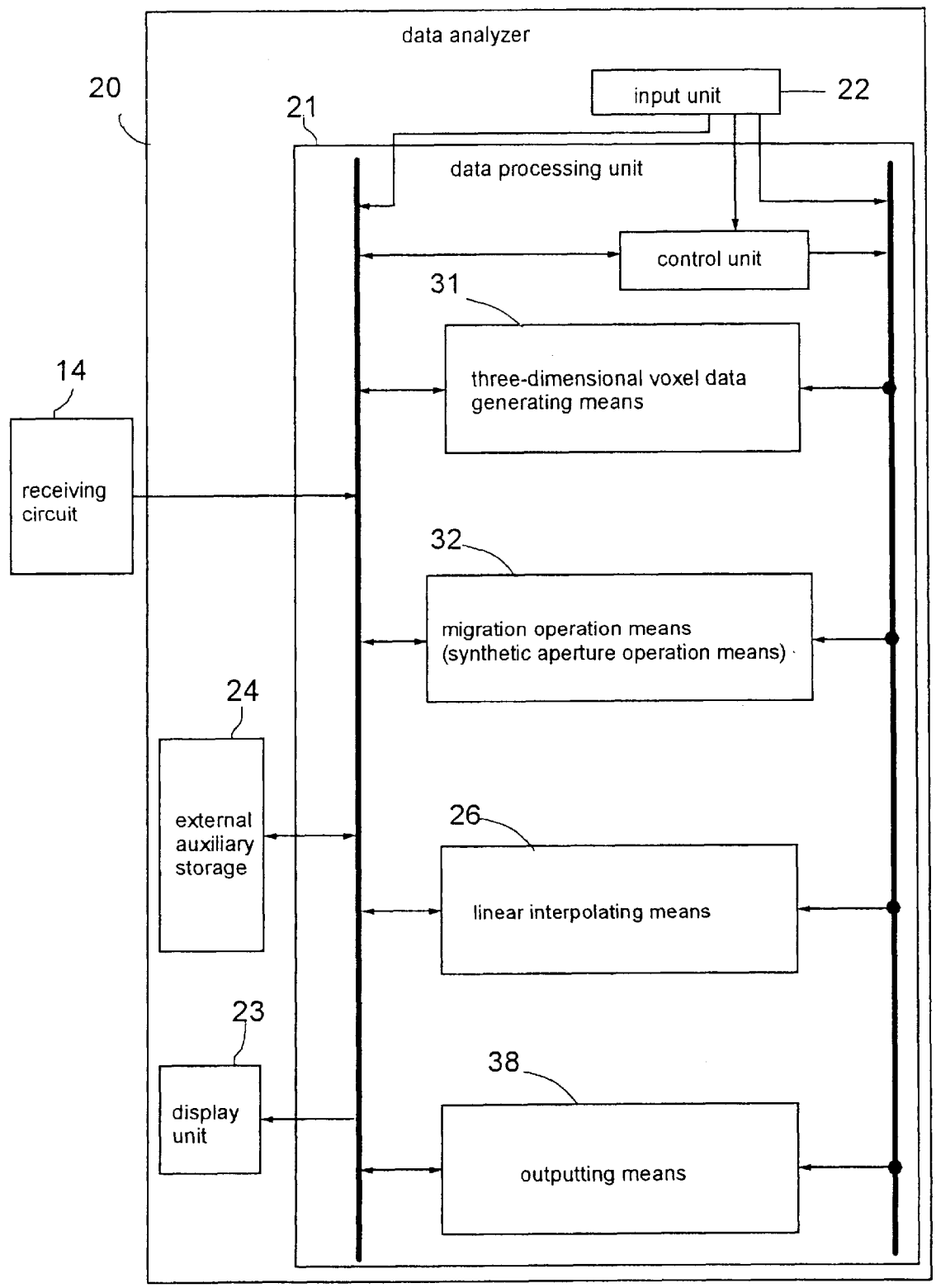
FIG. 12 is a functional block diagram of a data analyzer relating to a second embodiment.

Further, as shown in FIG. 12, the data analyzer 21 relating to the second embodiment, like that of the first embodiment, includes the three-dimensional voxel data generating means 31, the migration operation means 32 and the outputting means 38. The apparatus may further include other various means same as those employed in the first embodiment. However, FIG. 12 shows only those which are directly related to the second embodiment.

The three-dimensional voxel data generating means 31 is provided for generating three-dimensional voxel data for use in the subsequent processing and this generates the source three-dimensional voxel data s (x, y, t) expressing the received signal intensity directly in the functions of the position (x, y) on the medium surface and the time (t).

Figure 14:
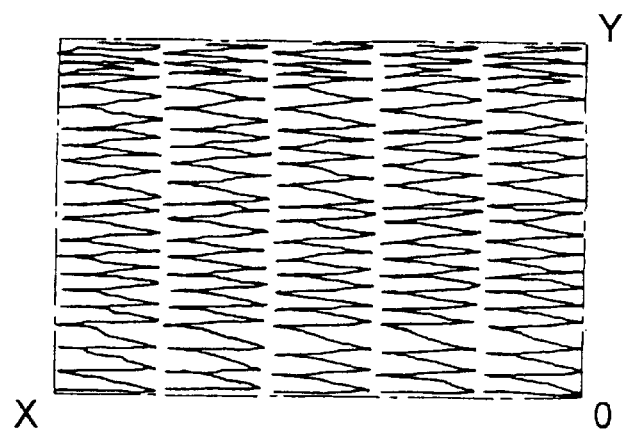
FIG. 14 is an explanatory view illustrating a movement pathway of a three-dimensional exploring apparatus when the exploration data used in the data processing procedure of the second embodiment were obtained.

Incidentally, referring to the three-dimensional voxel data generated by this three-dimensional voxel data generating means 31, if the reflected waves 5 as shown in FIG. 14 are received on the moving pathway as shown in FIG. 14, the three-dimensional voxel data corresponding to the reception position has a received signal intensity as a data value, but the other three-dimensional voxels have no substantive data values and are deficient in the data. Here, for the sake of convenience, the former three-dimensional voxels is defined as a source voxel and the latter three-dimensional voxels are defined as deficient voxels, respectively.

Because deficient voxels may be generated depending on the moving pathway, the data analyzer 21 includes a linear interpolating means 26 for interpolating such deficient voxels by a one-dimensional linear interpolation. This interpolating process will be described later.

In addition, if necessary, this interpolated three-dimensional voxel data s (x, t, t) will be subjected to a migration operation by the migration operation means 32 to be rendered into a new migration-processed three-dimensional voxel data S (x, y, t). Further, in place of the migration operation, like the first embodiment, a synthetic aperture operation may be effected.

Figure 15:
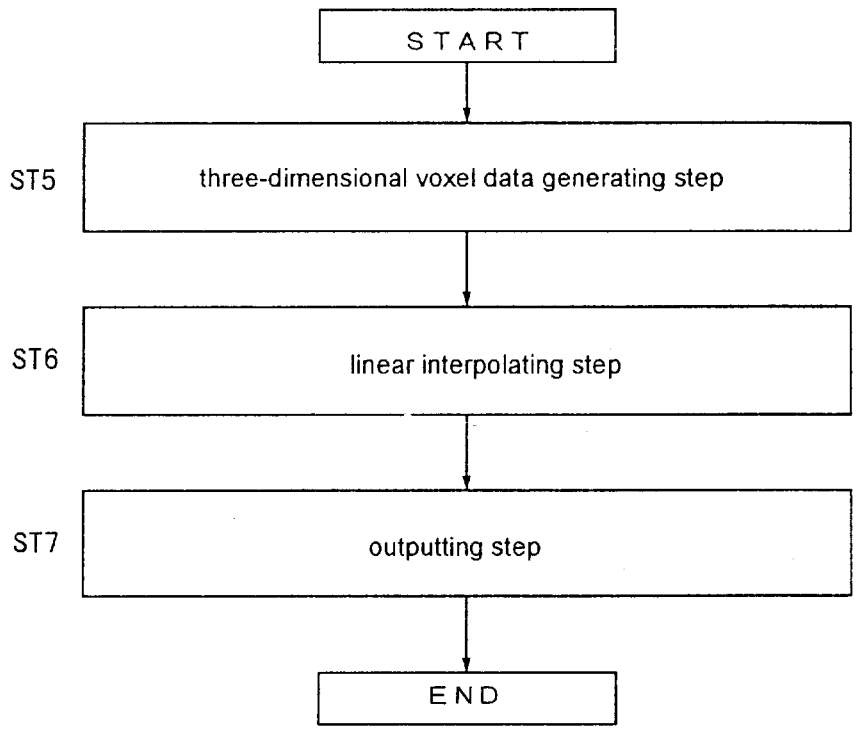
FIG. 15 is a flow chart illustrating the data processing procedure of the second embodiment.

Next, a three-dimensional exploring method relating to the second embodiment will be described with reference to a flow chart of FIG. 15 which illustrates a typical data processing procedure effected by the data analyzer 21.

1. Three-dimensional Voxel Data Generating Step (ST6)

This step is identical to that described hereinbefore for the foregoing first embodiment and therefore will not be described here.

2. Linear Interpolating Step (ST7)

At this step, the linear interpolating means 26 effects a data interpolation of a deficient voxel in the following manner on the source three-dimensional voxel data represented in multiple scales.

The data are present densely in the direction of the reflection time (t) of the source three-dimensional voxel data s (x, y, t). Therefore, this interpolation is rather considered as interpolation of two-dimensional data within the x-y plane. Then, the interpolation at each reflection time (t) interval is effected with using the weighting value obtained for the two-dimensional plane.

For the purpose of the interpolation of two-dimensional data on the x-y plane, first, a one-dimensional linear interpolation is effected along the y axis. In effecting this one-dimensional linear interpolation, only when a distance along which the deficient voxels are present consecutively in the y axis direction is shorter than the wavelength of the electromagnetic wave in the ground (in the case of the buried condition shown in FIG. 13, the relative dielectric constant: $\in_r$ is 9, the frequency of the electromagnetic wave is 300 MHz and its wavelength $\lambda$ is about 33 cm), this one-dimensional linear interpolating operation is effected on such deficient voxels. Whereas, if the distance is greater than the wavelength, the deficient voxels are left as deficient voxels without effecting the one-dimensional interpolation. Thereafter, the one-dimensional linear interpolation is effected this time along the x axis direction, in the identical manner effected previously along the y axis direction.

3. Outputting Step ($ST^8$)

Next, if necessary, the source three-dimensional voxel data s (x, y, t) obtained in the manner described above is subjected to a migration operation to be rendered into the three-dimensional voxel data S (x, y, t). By outputting such processed data, the buried pipe can be explored clearly.

Next, the effect of the linear interpolating step (ST7) will be explained concerning the three-dimensional voxel data obtained by exploring the buried pipes 50 under the buried condition shown in FIG. 13 along the moving pathway shown in FIG. 14.

Figure 16:
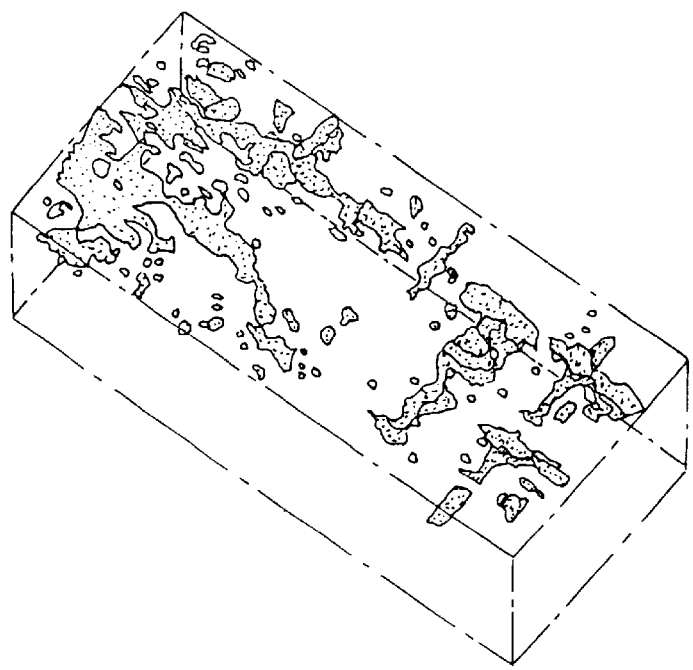
FIG. 16 is a diagram showing three-dimensional visualization of the results obtained by directly effecting a migration operation on exploration data (source three-dimensional voxel data) in the second embodiment.
Figure 17:
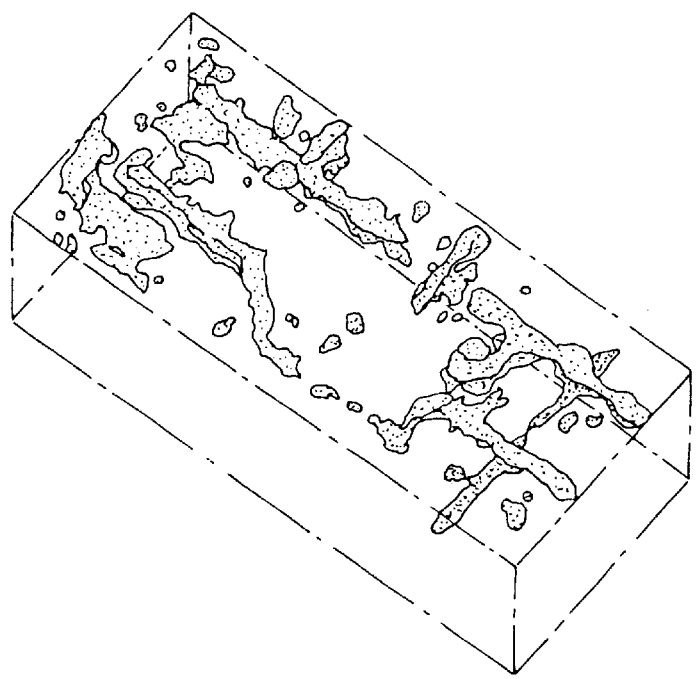
FIG. 17 is a diagram showing three-dimensional visualization of the results obtained by effecting a linear interpolating step and then the migration operation on exploration data (source three-dimensional voxel data) in the second embodiment.

FIG. 16 shows three-dimensional voxel data which were three-dimensionally visualized without using this linear interpolating step. Whereas, FIG. 17 shows three-dimensional voxel data which were three-dimensionally visualized with using the linear interpolating step. Incidentally, in both of the displays of FIGS. 16 and 17, a three-dimensional migration operation was effected respectively before the outputting, so as to facilitate the visual recognition. In FIG. 16, the images of the buried pipes appear intermittent due to a great amount of noise present, whereas FIG. 17 shows an excellent visualization. Hence, it was confirmed that the exploration precision can be improved by effecting a linear interpolating step. Incidentally, FIGS. 16 and 17 are schematic illustrations of the actual image displays.

Figure 18:
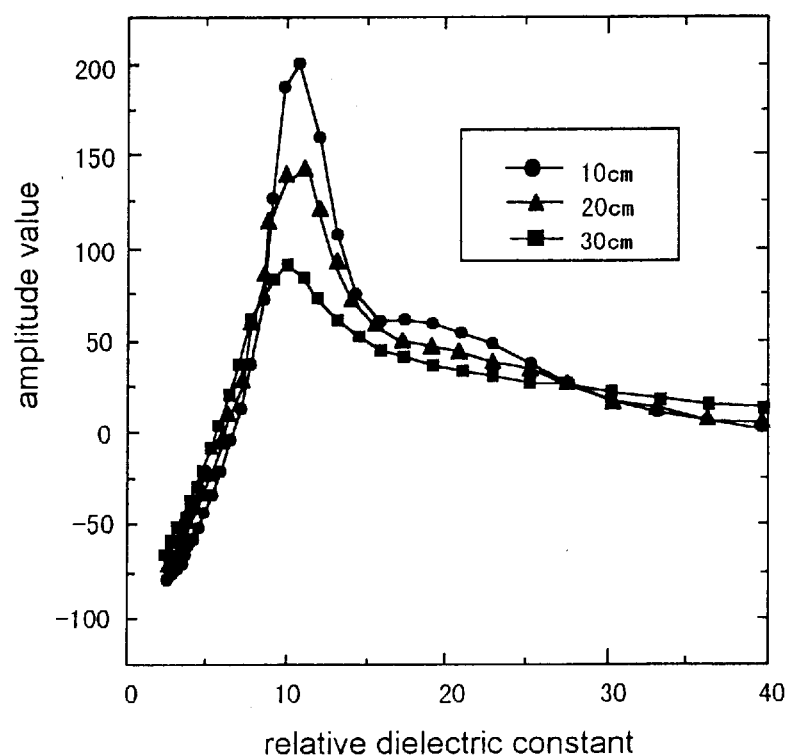
FIG. 18 is an explanatory view showing result of the migration operation after effecting a linear interpolating step under different conditions in the second embodiment.

Further, FIG. 18 shows the results of the migration operation effected on the explored image in the case of relative dielectric constant of 9 (wavelength was about 30 cm) by effecting the one-dimensional linear interpolation only when the distance along which deficient voxels existed consecutively in the y axis direction was less than 10 cm, 20 cm or 30 cm. The vertical axis represents the migration values and the horizontal axis represents the specific inductive capacity. As shown in FIG. 18, when the distance along which the deficient voxels were consecutively present in the y axis direction exceeded 30 cm, i.e., the wavelength of the electromagnetic wave in the buried condition shown in FIG. 4, the effect of migration operation was reduced, indicating improper interpolation.

In the foregoing embodiment, at the linear interpolating step (ST6), one-dimensional linear interpolations were effected along the x axis direction and y axis direction, respectively. Instead, such one-dimensional linear interpolations may be effected in any desired direction off these coordinate axes.

Third Embodiment

Next, a three-dimensional voxel data displaying method for accomplishing the third object of the present invention will be described.

As shown in FIG. 1, a three-dimensional exploring apparatus relating to this embodiment includes the transmitter/receiver 10 and the data analyzer 20 as the major components thereof, just like the first and second embodiments And, the characterizing features of the invention lie in the analytical processing effected by this data analyzer 20.

As shown in FIG. 1, in a soil 1 as a medium, there is buried an object 2 such as a steel pipe for transporting a fluid such as gas. The exploring apparatus 3 having the transmitter/receiver 10 and the data analyzer 20 explores the buried location of the object 2 while the apparatus is moved over the ground surface. The direction of this movement is the x direction in the example shown in FIG. 1. And, for obtaining three-dimensional voxel data as in the case with the present invention, after collecting data in the x direction, the apparatus is shifted by a predetermined amount in the y direction (front-to-back direction of FIG. 1) to collect data in the x direction again. By repeating this cycle, the apparatus sequentially collects a plurality of sets of data in the x direction. Incidentally, the object 2 shown in FIG. 1 is a schematic representation of an object to be explored. This represents e.g. a portion of a buried pipe 50 buried in certain conditions illustrated in FIG. 13 for example.

The overall construction and functions of a three-dimensional exploring apparatus relating to the third embodiment are identical to those of the first embodiment and have already been described with reference to FIGS. 1–3 and therefore they will not be described here.

Figure 19:
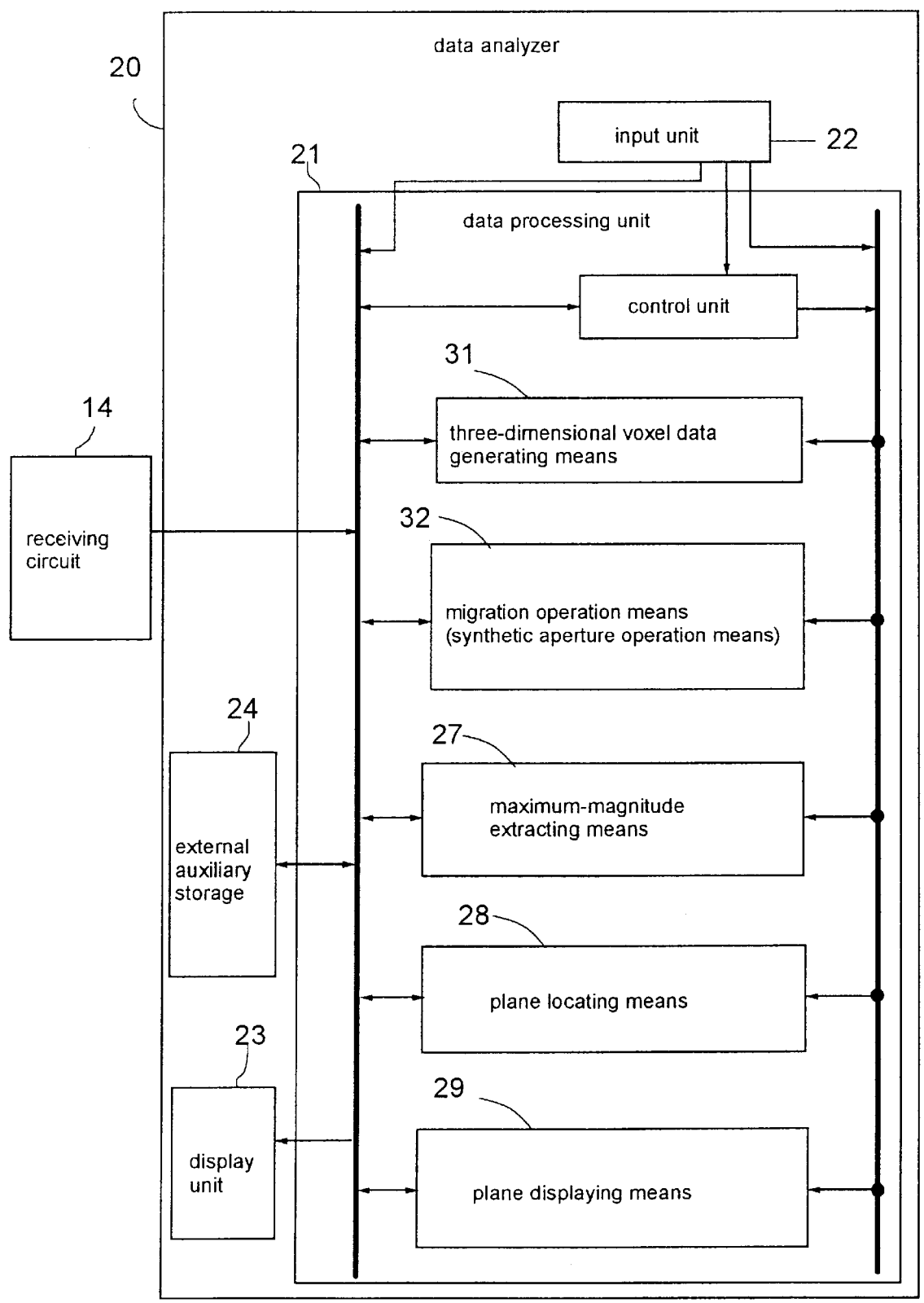
FIG. 19 is a functional block diagram of a data analyzer relating to the third embodiment.

Further, as shown in FIG. 19, the data analyzer 21 relating to the third embodiment, like that of the first or second embodiment, includes the three-dimensional voxel data generating means 31 and the migration operation means 32. The apparatus may further include other various means same as those of the first or second embodiment. However, FIG. 19 shows only those which are directly related to the third embodiment.

The three-dimensional voxel data generating means 31 is provided for generating three-dimensional voxel data for use in the subsequent processing and this generates the source three-dimensional voxel data s (x, y, t) expressing the received signal intensity directly in the functions of the position (x, y) on the medium surface and the time (t). When necessary, this source three-dimensional voxel data s (x, y, t) may be subjected to a migration operation by the migration operation means 32 to be rendered into migration-processed new three-dimensional voxel data S (x, y, t). Further, in place of such migration operation, a synthetic aperture operation may be effected, like the first embodiment. As these sets of data both have a three-dimensional structure, these sets of data (s) (x, y, t) and (S) (x, y, t) both comprise a group of data generated as "three-dimensional voxel data" by the three-dimensional voxel data generating means 31.

Further, this data analyzer 21 includes also a maximum-magnitude extracting means 27 for extracting from said three-dimensional voxel data s (x, y, t) generated by the three-dimensional voxel data generating means 31 or S (x, y, t) generated by the migration operation means 32, a maximum magnitude value of the amplitude value in the direction of the reflection time (t) axis for each position (x, y) on the medium surface; a plane-locating means 28 for locating said maximum magnitude value on a predetermined plane for each position (x, y) on the medium surface extracted by said maximum-magnitude extracting means; and a plane displaying means 29 for outputting said maximum magnitude value located on said predetermined plane and displaying it on the display unit 23.

Figure 20:
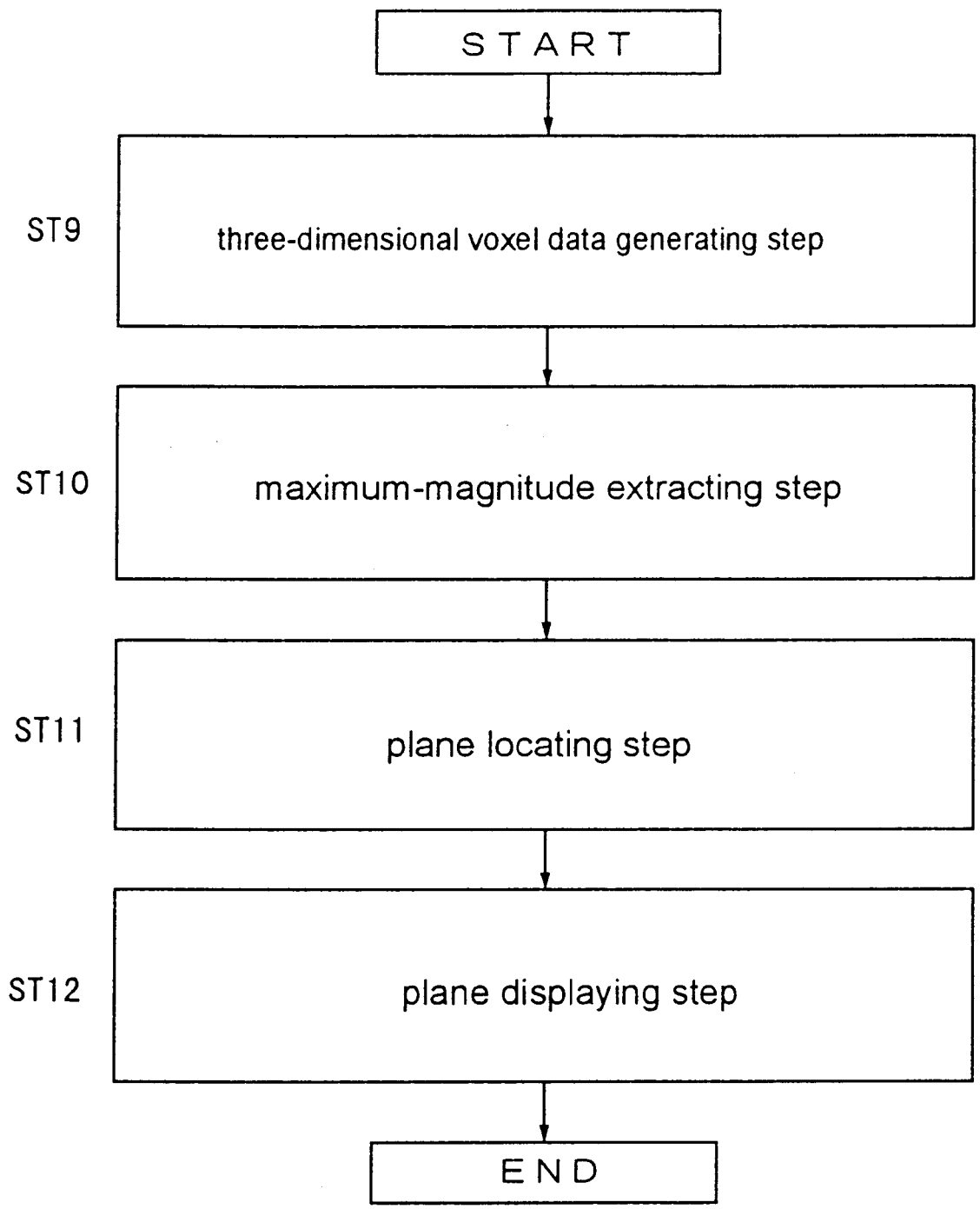
FIG. 20 is a flow chart illustrating a three-dimensional voxel data displaying method relating to the third embodiment.

Next, a three-dimensional exploring method relating to one mode of the embodiment of the invention will be described with reference to a flow chart of FIG. 20 which illustrates a typical data processing procedure effected by the data analyzer 21.

1. Three-dimensional Voxel Data Generating Step (ST9)

This step is identical to that described hereinbefore for the foregoing first embodiment and therefore will not be described here.

2. Maximum-magnitude Extracting Step (ST10)

From the three-dimensional voxel data S (x, y, t) generated at the three-dimensional voxel data generating step, the maximum-magnitude extracting means 27 reads out one after another, from the memory 21a, amplitude values in the direction of reflection time t axis for the respective positions (x, y) on the medium surface and extracts the maximum magnitude which is the maximum value of their magnitudes. And, in extracting such maximum magnitude for each position (x, y) on the medium surface, a reflection time $t_{MAX}$ having this maximum magnitude is also extracted. With this, even after the processing, it is still readily possible to grasp at which reflection time t (corresponding to the burying depth) the area of the buried object giving a strong signal is present.

3. Plane Locating Step (ST11)

At this step, the plane-locating means 28 locates the maximum magnitude and the reflection time $t_{MAX}$ for each position (x, y) on the medium surface extracted by the maximum-magnitude extracting step on a predetermined plane.

Actually, this is effected in an efficient manner by executing the maximum-magnitude extracting step and the plane-locating step one after another for each position (x, y) on the medium surface. More particularly, the maximum magnitude and the reflection time $t_{MAX}$ extracted for each position (x, y) on the medium surface are stored at a predetermined area within the memory 21a. When both these steps have been executed for all the positions (x, y) on the medium surface, the maximum magnitude for each position (x, y) on the medium surface will have been located on a predetermined plane. In the course of this, by assigning the storage area of the maximum magnitude as t=0, this plane will be located on the uppermost plane of the three-dimensional voxel data S (x, y, t).

4. Plane Displaying Step (ST12)

The plane displaying means 29 outputs the maximum magnitudes located on planes at the plane-locating step and displays them on the display unit 23.

Figure 21:
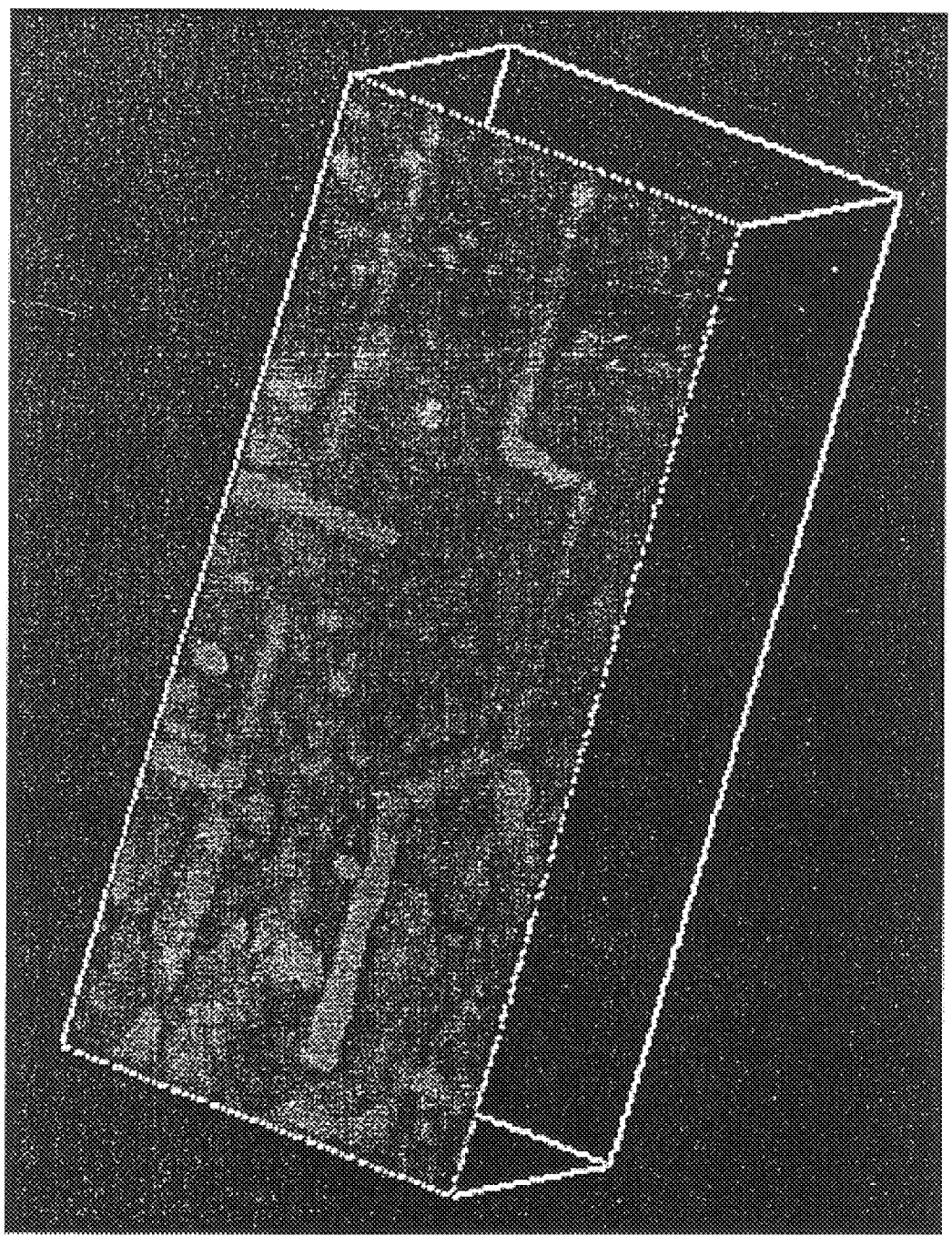
FIG. 21 is an example of displayed image showing the result of processing by the three-dimensional voxel data displaying method of the third embodiment.

FIG. 21 shows an example of image displayed at this step for the results of the three-dimensional voxel data exploring the buried pipes shown in FIG. 13. In this displayed image shown in FIG. 21, the visibility is improved in comparison with those of the prior art shown in FIGS. 26 through 30; and it may be understood that the two-dimensional layout of the buried condition can be readily recognized.

Next, other modes of the third embodiment will be described.

<1> When the maximum magnitude in the direction of reflection time axis (t) is extracted for each position (x, y) on the medium surface at the maximum-magnitude extracting step, it is also a preferred mode to eliminate those amplitude values within a predetermined range of reflection time (t).

Figure 22:
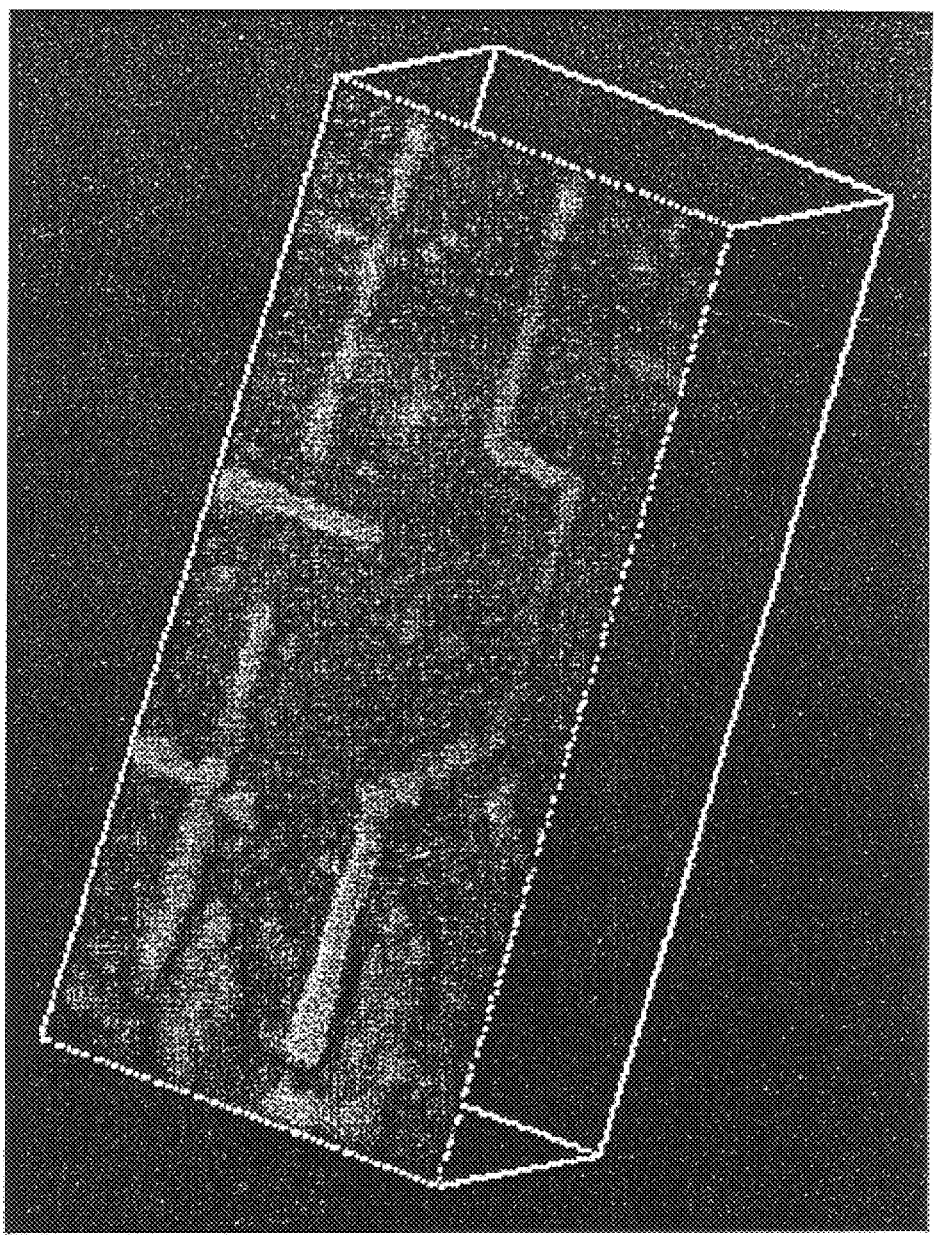
FIG. 22 is an example of displayed image showing the result of processing obtained by a three-dimensional voxel data displaying method relating to another mode of the third embodiment.

FIG. 22 shows an example of display image when maximum magnitudes extracted in this manner are image displayed at the plane displaying step in the manner identical to the foregoing embodiment. Incidentally, in the mode shown in FIG. 22, the extraction of maximum magnitudes was effected only for those magnitude values of three-dimensional voxel data S (x, y, t) which have reflection times (t) ranging between 8 ns~78 ns (converted to the burying depth ranging of 0.4 m~3.9 m).

From FIG. 22, it may be understood that it has become possible to more clearly grasp weak reflection signals from the buried pipes.

Further, in extracting the maximum magnitude in the direction of reflection time (t) axis for each position (x, y) on the medium surface, it is also preferred, for the sake of improvement of S/N ratio, to consider only those voxels whose polarity of magnitudes is positive or negative.

<2> At the three-dimensional voxel data generating step, on the source three-dimensional voxel data s (x, y, t), a plurality of synthetic aperture operations or migration operations may be effected with using a plurality of underground propagation velocities (propagation velocities within the medium) so as to generate the three-dimensional voxel data S (x, y, t) for the plurality of propagation velocities, respectively and then, on each of these sets of data, the maximum-magnitude extracting step and the plane displaying step may be effected individually.

As a result, it becomes possible to select the processing result at an appropriate propagation velocity from the displayed results of the maximum magnitudes of the three-dimensional voxel data S (x, y, t) at the plane displaying step for each propagation velocity.

Figure 23:
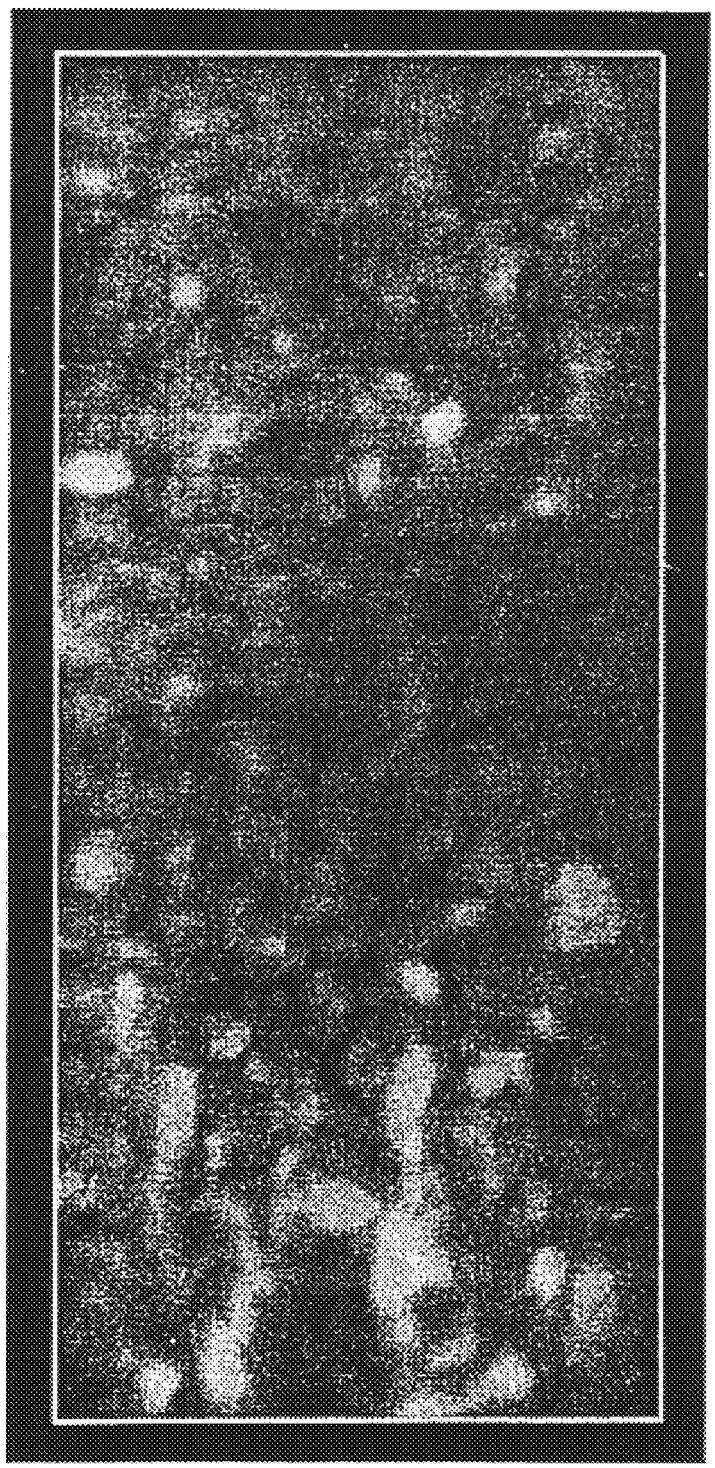
FIG. 23 is an example of displayed image (the relative dielectric constant of the underground is 4) showing the result of processing obtained by a three-dimensional voxel data displaying method relating to still another mode of the third embodiment.
Figure 24:
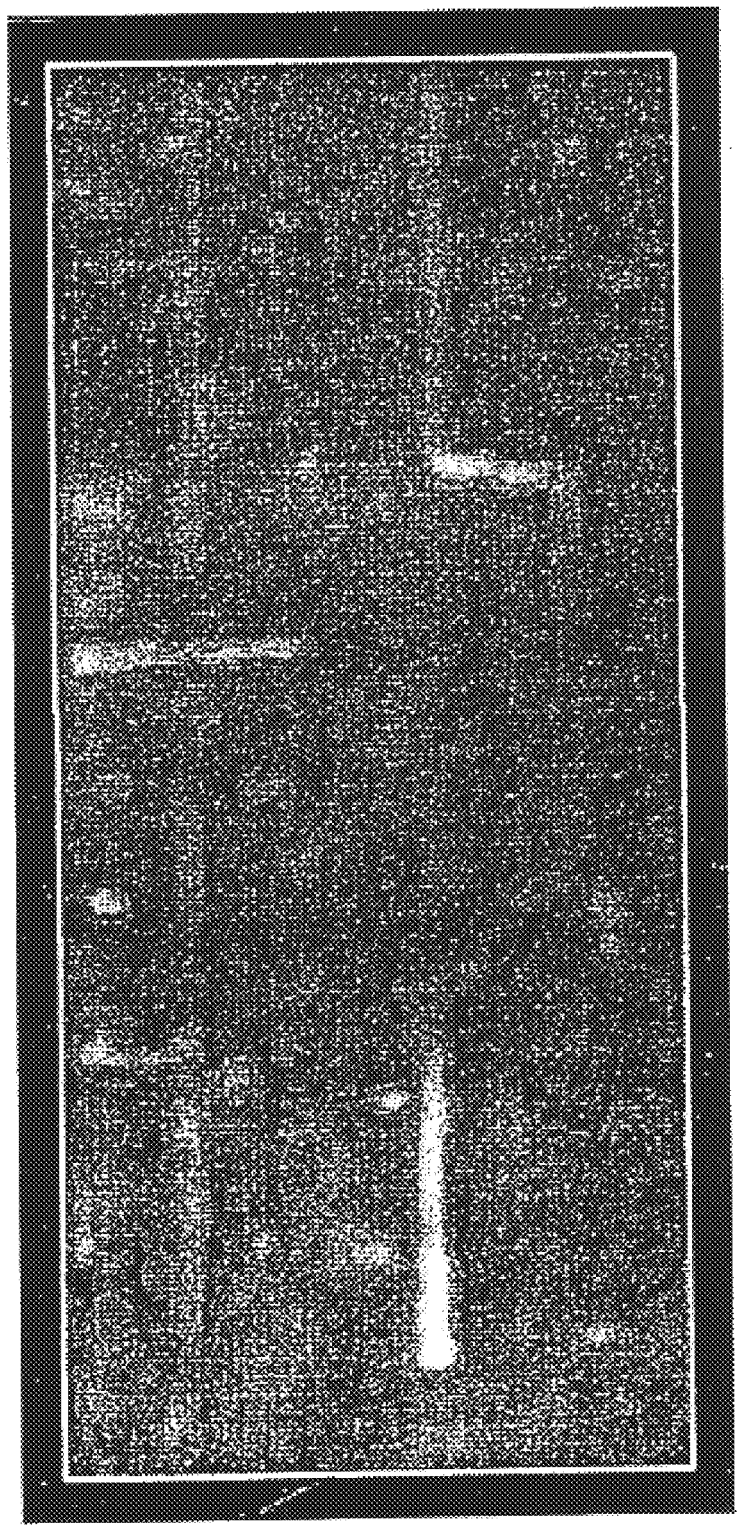
FIG. 24 is an example of displayed image (the relative dielectric constant of the underground is 9) showing the result of processing obtained by a three-dimensional voxel data displaying method relating to still another mode of the third embodiment.
Figure 25:
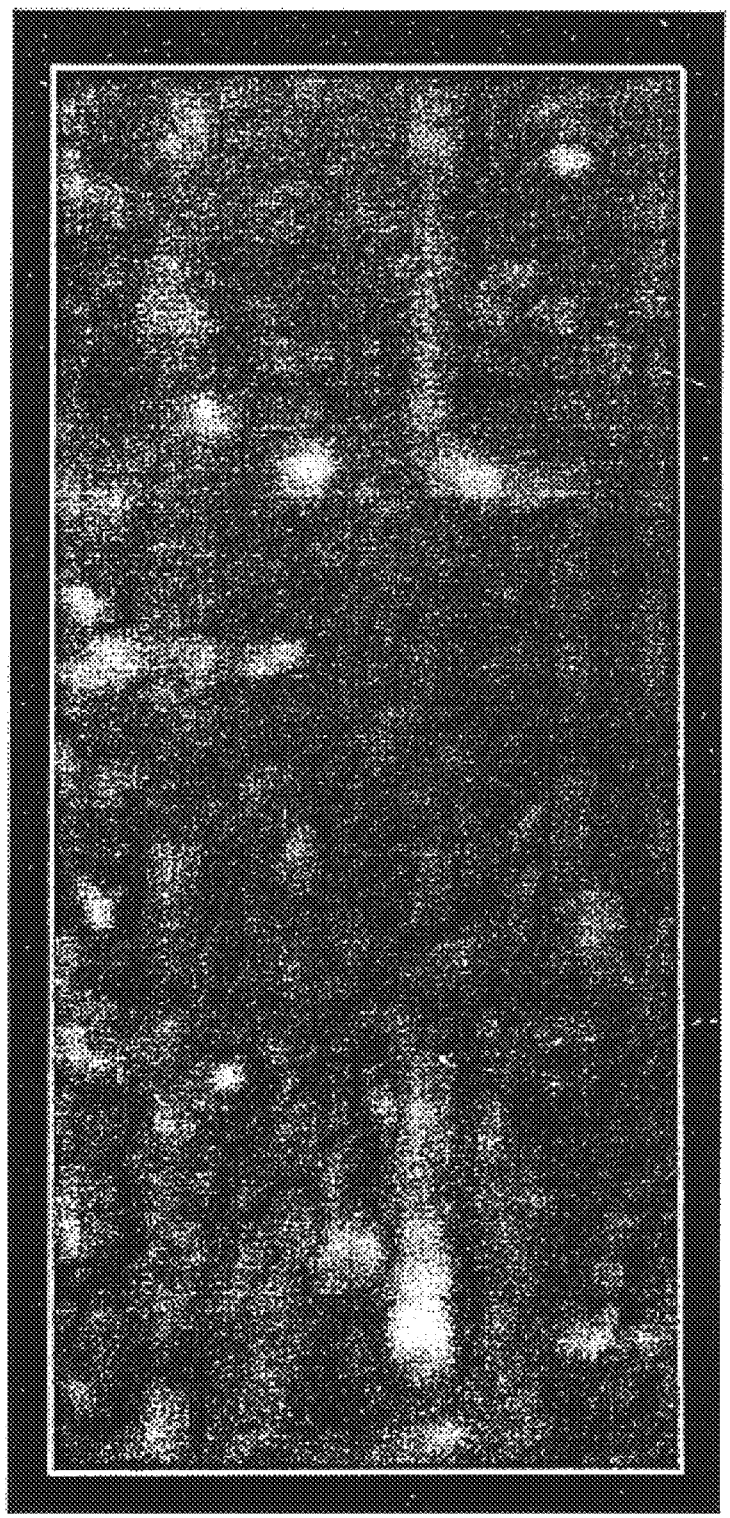
FIG. 25 is an example of displayed image (the relative dielectric constant of the underground is 19) showing the result of processing obtained by a three-dimensional voxel data displaying method relating to still another mode of the third embodiment.
Figure 26:
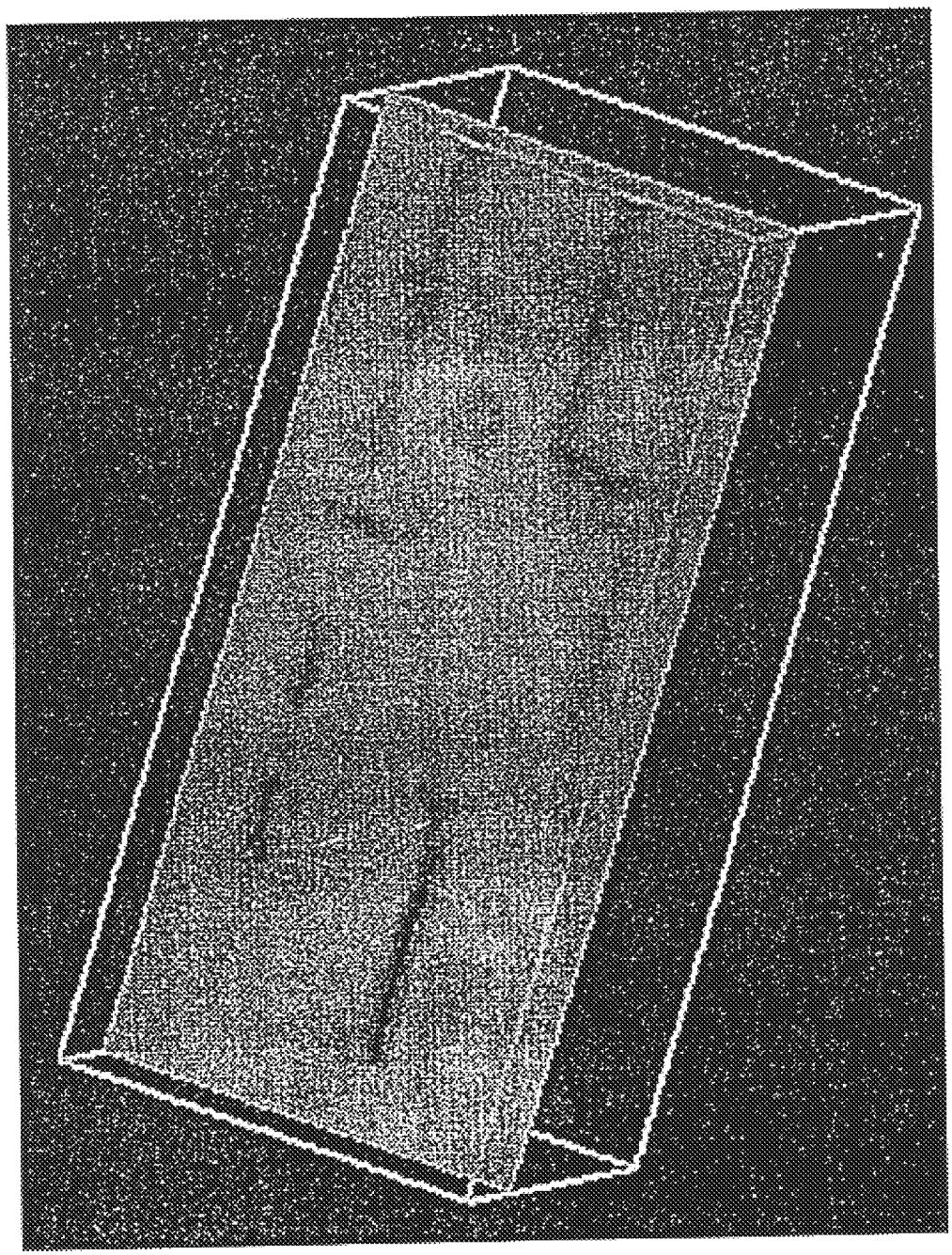
FIG. 26 is an example of displayed image showing result of processing obtained for a horizontal section by prior art corresponding to the third embodiment.
Figure 27:
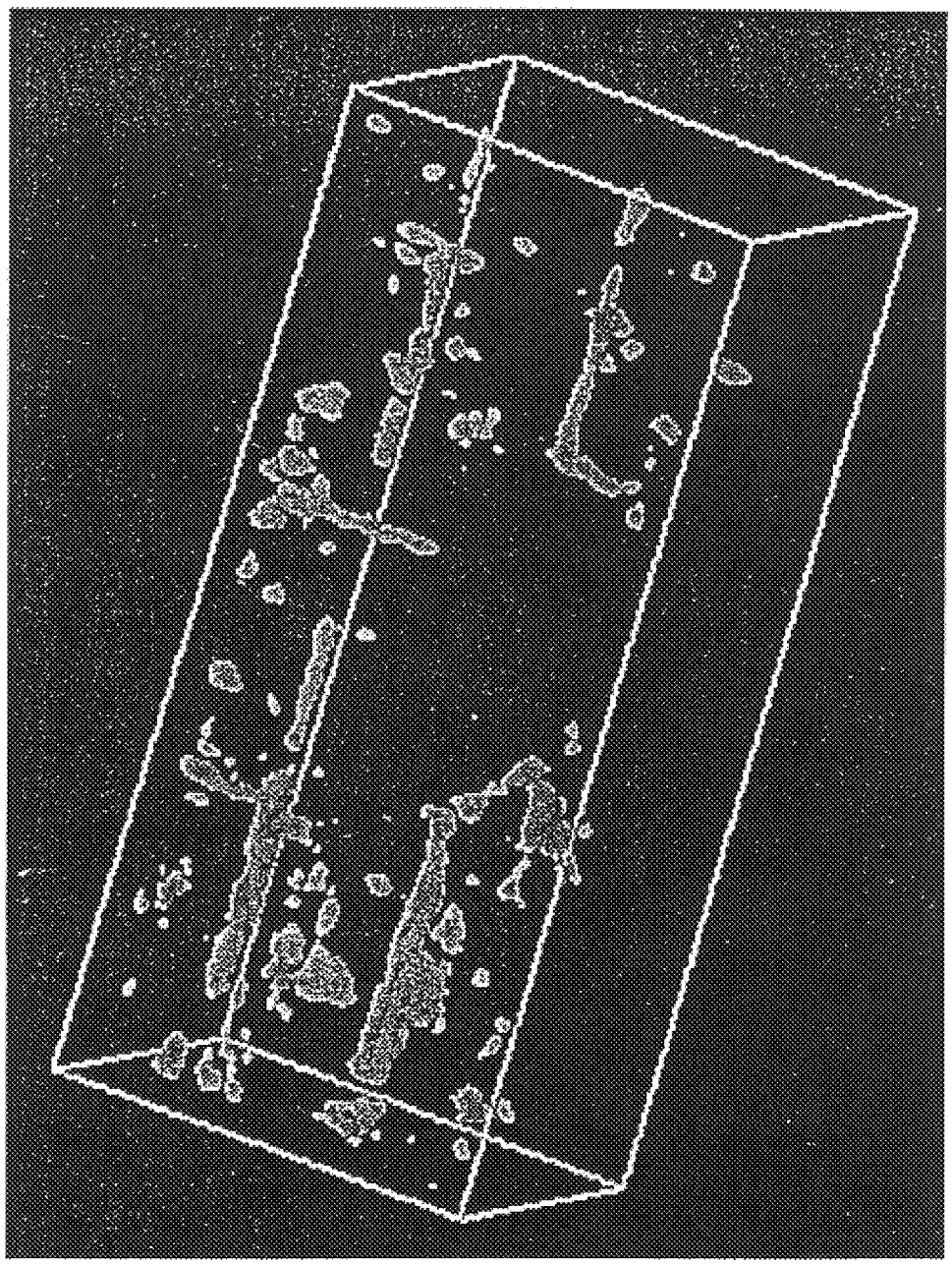
FIG. 27 is an example of displayed image showing result of processing by the surface display type prior art corresponding to the third embodiment.
Figure 28:
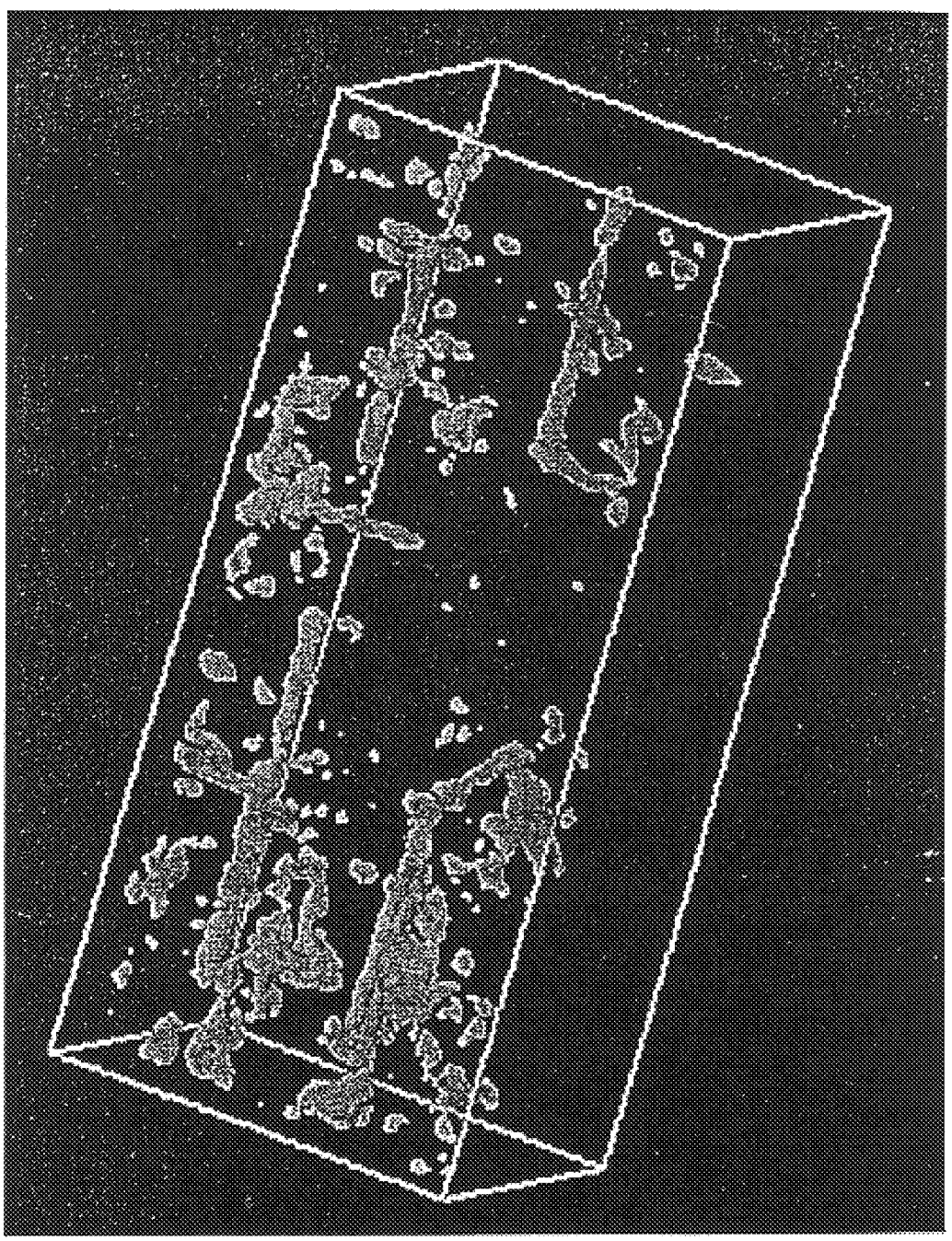
FIG. 28 is an example of displayed image showing result of processing by the surface display type prior art corresponding to the third embodiment.
Figure 29:
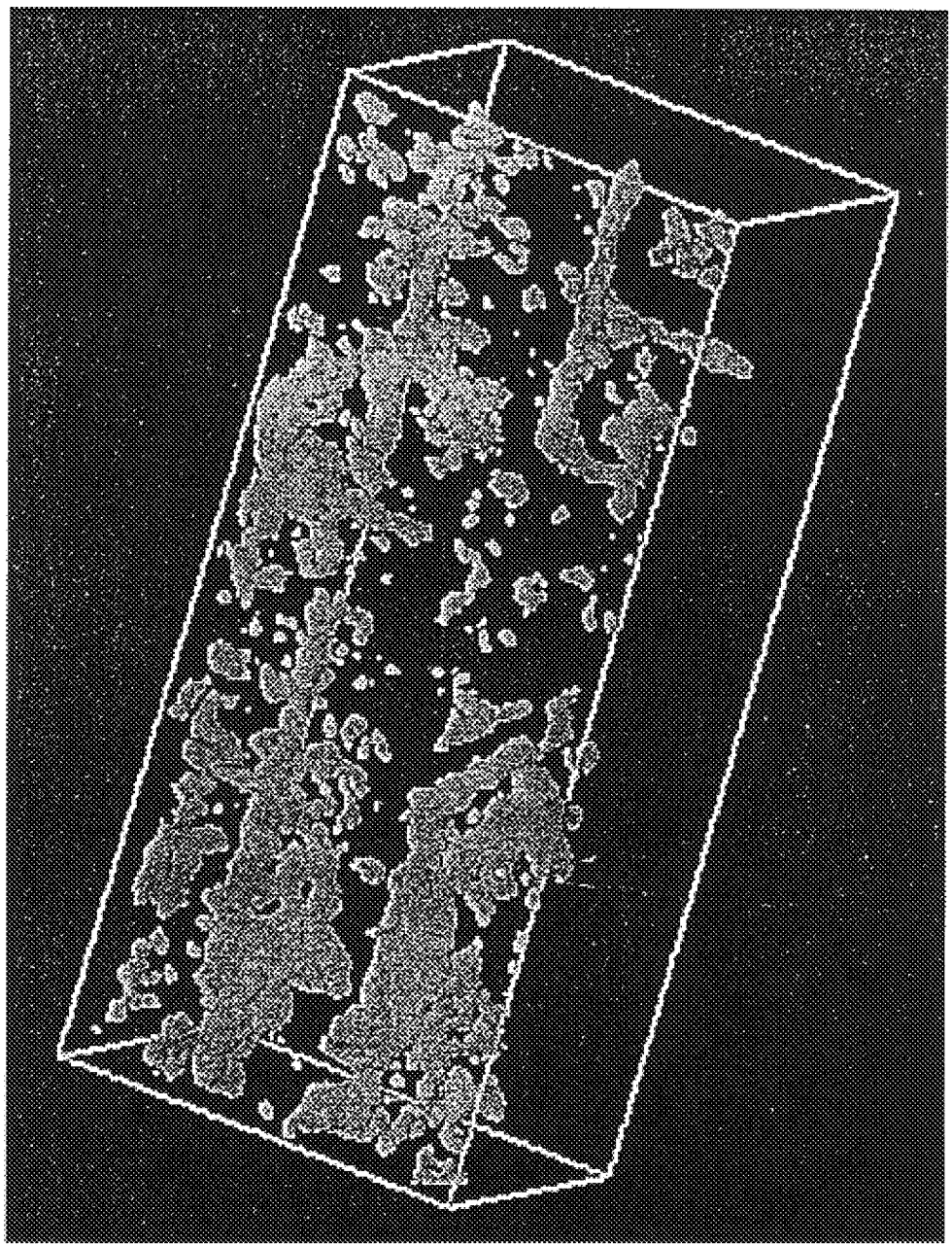
FIG. 29 is an example of displayed image showing result of processing by the surface display type prior art corresponding to the third embodiment.
Figure 30:
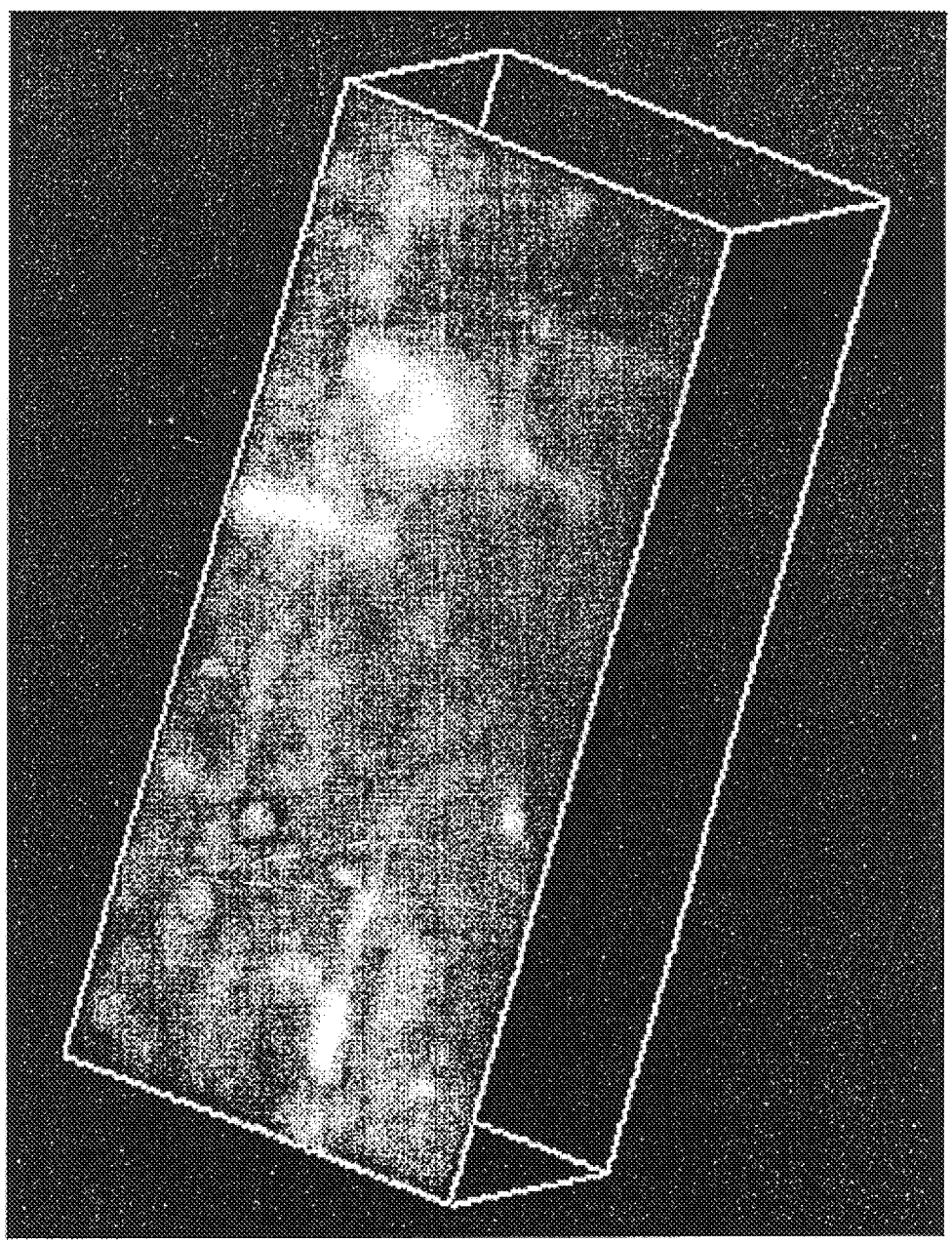
FIG. 30 is an example of displayed image showing result of processing by the integration type prior art corresponding to the third embodiment.

FIGS. 23, 24 and 25 respectively show, in this order, the results obtained with three kinds of setting of the underground propagation velocity to 0.50° C., 0.33° C. and 0.23° C. From FIGS. 23, 24 and 25, it may be seen that the focusing condition is best when the propagation velocity was set to 0.33° C. (relative dielectric constant 9), so that this processing result may be determined as the result obtained at the appropriate underground propagation velocity.

5. Industrial Applicability

The three-dimensional exploring method and apparatus and the three-dimensional voxel data displaying method and apparatus according to the present invention may be utilized for a three-dimensional exploration for exploring a location of an object present in a medium by emitting a wave signal by means of an electromagnetic wave or sonic wave into the medium while movement on the surface of the medium, receiving the signal reflected from this object within the medium and then processing the received signal. The invention may be applied for e.g. three-dimensional exploration of an underground buried object such as a gas pipe.

What is claimed is:

1. In a three-dimensional exploring method for finding the location of an object present within a medium by sequentially effecting a transmitting/receiving step of transmitting a wave signal by means of an electromagnetic wave or sonic wave into the medium and receiving the signal reflected from the object within the medium in the course of movement over the surface of the medium and a three-dimensional voxel data generating step of generating three-dimensional voxel data in the form of coordinates (x, y, t) consisting of a position (x, y) on the medium surface and a reflection time (t) based on the intensity of the reflected signal;

the method comprising:
- a maximum-magnitude extracting-step of extracting, from the three-dimensional voxel data generated by the three-dimensional voxel data generating step, a maximum value of the magnitude of the amplitude value and a reflection time $t_{MAX}$ providing the maximum value in the direction of the reflection time (t) axis for the position (x, y) on the medium surface;
- a plane-locating step of locating, respectively on an x-y plane of a predetermined reflection time (t), said maximum value and said reflection time $t_{MAX}$ extracted by the maximum-magnitude extracting step;
- an object-voxel selecting step at which said x-y plane having said maximum value located thereon is displayed and a coordinate point is designated on said displayed plane in accordance with a manual input operation, so that one or more object voxels are selected by specifying them with said designated coordinate point and said reflection time $t_{MAX}$ associated therewith;
- a binarizing step of extracting a candidate voxel group consisting of a plurality of voxels having amplitude values of positive or negative polarity and having magnitudes greater than a predetermined threshold and interconnected with each other; and
- a connecting/composing step of extracting, from the candidate voxel group extracted by the binarizing step, a connection-candidate voxel group to be connected to the object voxels selected by the object voxel selecting step and connecting said connection-candidate voxel group with said object voxels thereby to compose an object voxel group.

2. The three-dimensional exploring method according to claim 1, wherein the predetermined threshold utilized by the binarizing step is set based on the amplitude value of the object voxel selected by the object voxel selecting step.

3. The three-dimensional exploring method according to claim 1, wherein at the object voxel selecting step, said one or more object voxels are selected by substituting, for said designated coordinate point, a coordinate point which is present adjacent said designated coordinate point and which has the same polarity as the designated coordinate point and an amplitude value of the maximum magnitude.

4. The three-dimensional exploring method according to claim 1, wherein the method effects a synthetic aperture operation or a migration operation on said three-dimensional voxel data or said candidate-voxel group or on said object voxel group.

5. The three-dimensional exploring method according to claim 1, wherein at said three-dimensional voxel data generating step, a Wiener filtering operation or an amplitude adjusting operation is effected on the three-dimensional voxel data in the direction of the reflection time (t) axis, and the source three-dimensional voxel data before the processing is replaced by the processed data.

6. A three-dimensional exploring apparatus for finding the location of an object present within a medium comprising: transmitting/receiving means for transmitting a wave signal by means of an electromagnetic wave or sonic wave into the medium and receiving the signal reflected from the object within the medium in the course of movement over the surface of the medium and three-dimensional voxel data generating means for generating three-dimensional voxel data in the form of coordinates (x, y, t) consisting of a position (x, y) on the medium surface and a reflection time (t) based on the intensity of the reflected signal;

wherein the apparatus further comprises:
- maximum-magnitude extracting means for extracting from said three-dimensional voxel data generated by the three-dimensional voxel data generating means, a maximum magnitude value of the amplitude value and a reflection time $t_{MAX}$ providing the maximum value in the direction of the reflection time (t) axis for each position (x, y) on the medium surface;
- plane-locating means for locating respectively, on a predetermined plane for each position (x, y) on the medium surface, said maximum magnitude value and said reflection time $t_{MAX}$ extracted by said maximum-value extracting means;
- an object-voxel selecting means for displaying said x-y plane having said maximum value located thereon and designating a coordinate point on said displayed plane in accordance with a manual input operation, so that one or more object voxels are selected by specifying them with said designated coordinate point and said reflection time $t_{MAX}$ associated therewith;
- binarizing means for extracting a candidate voxel group consisting of a plurality of voxels having amplitude values of positive or negative polarity and magnitudes greater than a predetermined threshold and interconnected with each other; and
- connecting/composing means for extracting, from the candidate voxel group extracted by the binarizing means, a connection-candidate voxel group to b connected to the object voxels selected by the object-voxel selecting means and combining said connection-candidate voxel group with said object voxels thereby to compose an object voxel group.

7. In a three-dimensional exploring method for finding the location of an object present within a medium by sequentially effecting a transmitting/receiving step of transmitting a wave signal by means of an electromagnetic wave or sonic wave into the medium and receiving the signal reflected from the object within the medium in the course of movement over the surface of the medium and a three-dimensional voxel data generating step of generating three-dimensional voxel data in the form of coordinates (x, y, t) consisting of a position (x, y) on the medium surface and a reflection time (t) based on the intensity of the reflected signal;

wherein when the three-dimensional voxel data generated by the three-dimensional voxel data generating step contains a voxel deficient in data, the method effects, on said deficient voxel, a one-dimensional linear interpolation step of effecting a one-dimensional linear interpolation in a predetermined direction in an x-y plane including said deficient voxel when a distance along which the deficient voxels are present consecutively is shorter than a wavelength of the wave signal within said medium.

8. The three-dimensional exploring method according to claim 7, wherein said linear interpolation step is effected for two or more times with varying the direction of the one-dimensional linear interpolation.

9. A three-dimensional exploring apparatus for finding the location of an object present within a medium comprising: transmitting/receiving means for transmitting a wave signal by means of an electromagnetic wave or sonic wave into the medium and receiving the signal reflected from the object within the medium in the course of movement over the surface of the medium and three-dimensional voxel data generating means for generating three-dimensional voxel data in the form of coordinates (x, y, t) consisting of a position (x, y) on the medium surface and a reflection time (t) based on the intensity of the reflected signal;

wherein the apparatus comprises linear interpolating means for effecting, when three-dimensional voxel data generated by three-dimensional voxel data generating means contains a voxel deficient in data, on said deficient voxel, a one-dimensional linear interpolation in a predetermined direction in an x-y plane including said deficient voxel when a distance along which the deficient voxels are present consecutively is shorter then a wavelength of the wave signal within said medium.

10. In a method of displaying three-dimensional voxel data generated in the form of coordinates (x, y, t) consisting of a position (x, y) on a medium surface and a reflection time (t) based on the intensity of a reflected signal of a wave signal transmitted from the medium surface into the medium and reflected therefrom;

the method executes: for said three-dimensional voxel data, a maximum-magnitude extracting step of extracting a maximum magnitude value of the amplitude value in the direction of the reflection time (t) axis for each position (x, y) on the medium surface, a plane-locating step of locating said maximum magnitude value on a predetermined plane for each position (x, y) on the medium surface extracted by said maximum-value extracting step, and a plane displaying step of displaying said maximum magnitude value located on said predetermined plane.

11. The three-dimensional voxel data displaying method according to claim 10, wherein a maximum value and a minimum value are obtained from the maximum magnitude values extracted at said maximum magnitude extracting step and the maximum value and said minimum value respectively become an upper limit and a lower limit of the display scale.

12. The three-dimensional voxel data displaying method according to claim 10, wherein at said maximum magnitude extracting step for extracting the maximum magnitude values for each position (x, y) on the medium surface, a reflection time $t_{MAX}$ providing the maximum magnitude values is also extracted.

13. The three-dimensional voxel data displaying method according to claim 10, wherein at the maximum magnitude extracting step for extracting maximum magnitude values of the amplitude value in the direction of the reflection time (t) axis for each position (x, y) on the medium surface, any amplitude values within a predetermined range of reflection time (t) are excluded.

14. The three-dimensional voxel data displaying method according to claim 10, wherein at the maximum magnitude extracting step for extracting the maximum magnitude values of the amplitude values in the direction of the reflection time (t) axis for each position (x, y) on the medium surface, only either voxels whose amplitude value polarity is positive or negative are used for the extracting step.

15. The three-dimensional voxel data displaying method according to claim 10, wherein prior to the maximum magnitude extracting step, a synthetic aperture operation or a migration operation is effected on three-dimensional voxel data consisting of the reflected signal intensity so as to generate said three-dimensional voxel data to be displayed.

16. The three-dimensional voxel data displaying method according to claim 15, wherein said synthetic aperture operation or migration operation is effected at various propagation velocities in various kinds of medium to generate a set of the three-dimensional voxel data for each of the propagation velocities, with said maximum magnitude extracting step and said plane locating step effected for each set of three-dimensional voxel data associated with each propagation velocity, and a processing result at an appropriate propagation velocity is selected based on the displayed results of the sets of three-dimensional voxel data at said plane displaying step for each propagation velocity.

17. An apparatus for displaying three-dimensional voxel data generated in the form of coordinates (x, y, t) consisting of a position (x, y) on a surface of a medium and a reflection time (t) based on the intensity of a reflected signal of a wave signal transmitted from the medium surface into the medium and reflected therefrom;

wherein the apparatus comprises: maximum-magnitude extracting means for extracting from said three-dimensional voxel data, a maximum magnitude value of the amplitude value in the direction of the reflection time (t) axis for each position (x, y) on the medium surface; plane-locating means for locating said maximum magnitude value on a predetermined plane for each position (x, y) on the medium surface extracted by said maximum-value extracting means; and plane displaying means for displaying said maximum value located on said predetermined plane.

* * * * *

UNITED STATES PATENT AND TRADEMARK OFFICE
CERTIFICATE OF CORRECTION

PATENT NO. : 6,573,855 B1
DATED : June 3, 2003
INVENTOR(S) : Hideki Hayakawa et al.

It is certified that error appears in the above-identified patent and that said Letters Patent is hereby corrected as shown below:

Title page,
Item [57], ABSTRACT,
Line 23, "contains.a" should read -- contains a --.

Column 3,
Line 39, "thereof" should read -- thereof. --.

Column 4,
Line 24, "an manual" should read -- a manual --.
Line 31, "SIN" should read -- S/N --.
Line 37, "note" should read -- noted --.
Line 41, "charactelizing" should read -- characterizing --.
Lines 43-44, "an transmitting" should read -- a transmitting --.

Column 8,
Line 5, "SIN" should read -- S/N --.
Line 44, "an tansmitting" should read -- a transmitting --.

Column 9,
Line 20, "dearly" should read -- clearly --.
Line 38, "charactelizing,feature," should read -- characterizing feature, --.

Column 11,
Line 5, "they" should read -- $t_{MAX}$ --.
Line 44, "medium.," should read -- medium. --.

Column 18,
Line 21, "binaiizmng" should read -- binarizing --.

Column 20,
Line 25, "dearly" should read -- clearly --.

Column 22,
Line 47, "(x, t, t)" should read -- (x, y, t) --.

Column 26,
Lines 37-38, "0.50º C., 0.33 º C. and 0.23 º C." should read -- 0.50$C_o$, 0.33 $C_o$, and 0.23$C_o$ --.
Line 40, 0.33º C." should read -- 0.33$C_o$ --.

UNITED STATES PATENT AND TRADEMARK OFFICE
CERTIFICATE OF CORRECTION

PATENT NO. : 6,573,855 B1
DATED : June 3, 2003
INVENTOR(S) : Hideki Hayakawa et al.

It is certified that error appears in the above-identified patent and that said Letters Patent is hereby corrected as shown below:

<u>Column 28,</u>
Line 31, "to b" should read -- to be --.
Line 63, "medium comprising:" should read -- medium, including --.

<u>Column 29,</u>
Line 14, "then a" should read -- than a --.

Signed and Sealed this

Fourteenth Day of October, 2003

JAMES E. ROGAN
*Director of the United States Patent and Trademark Office*